United States Patent
Rofougaran et al.

(10) Patent No.: US 12,557,050 B1
(45) Date of Patent: Feb. 17, 2026

(54) SYSTEM AND METHOD FOR TIME DIVISION DUPLEXING SYNCHRONIZATION IN WIRELESS NETWORK

(71) Applicant: PELTBEAM INC., Sherman Oaks, CA (US)

(72) Inventors: Ahmadreza Rofougaran, Newport Beach, CA (US); Shervin Alireza Odabaee, Newport Coast, CA (US); Mehdi Hatamian, Mission Viejo, CA (US); Arman Rofougaran, Newport Coast, CA (US); Milan Rofougaran, Newport Coast, CA (US); Kavian Odabaee, Newport Coast, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

(21) Appl. No.: 19/335,014

(22) Filed: Sep. 22, 2025

(51) Int. Cl.
*H04W 56/00* (2009.01)
*H04L 5/14* (2006.01)

(52) U.S. Cl.
CPC ... *H04W 56/0015* (2013.01); *H04W 56/0045* (2013.01); *H04L 5/14* (2013.01)

(58) Field of Classification Search
CPC ...................... H04W 56/0015; H04W 56/0045
USPC .......................................................... 370/280
See application file for complete search history.

(56) References Cited

U.S. PATENT DOCUMENTS

| | | | | |
|---|---|---|---|---|
| 2006/0193271 | A1* | 8/2006 | Proctor, Jr. | H04B 7/022 370/294 |
| 2022/0070802 | A1* | 3/2022 | Jain | H04W 72/0446 |
| 2024/0155526 | A1* | 5/2024 | Zhao | H04B 7/15528 |

* cited by examiner

*Primary Examiner* — Faisal Choudhury
(74) *Attorney, Agent, or Firm* — CHIP LAW GROUP

(57) ABSTRACT

A system for time division duplexing (TDD) synchronization in a wireless network includes a master access point (MAP) device configured to periodically transmit a synchronization signal to one or more repeater devices of a plurality of repeater devices. The system includes a repeater device configured to monitor signal quality indicator data associated with the synchronization signal received from the MAP device and filter the signal quality indicator data to remove transient fluctuations indicative of noise. The repeater device determines an average from the filtered signal quality indicator data over a time window and generates timing adjustment signals. The repeater device controls TDD switch to generate a TDD signal and adjusts timing edges of the generated TDD signal to maintain synchronization with the MAP device.

20 Claims, 6 Drawing Sheets

SYSTEM AND METHOD FOR TIME DIVISION DUPLEXING SYNCHRONIZATION IN WIRELESS NETWORK

CROSS-REFERENCE TO RELATED APPLICATIONS/INCORPORATION BY REFERENCE

None

FIELD OF TECHNOLOGY

Certain embodiments of the disclosure relate to a wireless communication system. More specifically, certain embodiments of the disclosure relate to a system and a method for time division duplexing synchronization in a wireless network.

BACKGROUND

Conventional communication devices, such as wireless access points (WAPs) and repeaters, are often used to extend the wireless coverage of existing wireless signals to access the Internet and to increase the number of end-user devices. However, Wi-Fi® signals, under the limitation of the Wi-Fi® communication protocol, have a defined range beyond which the connectivity is lost. Thus, many WAPs or range extenders are used if wireless coverage for Wi-Fi® signals is to be extended. However, maintaining precise time division duplexing (TDD) synchronization between such communication devices for providing peak performance and interference prevention becomes increasingly challenging.

The emergence of fifth generation (5G) technology standards for cellular networks has unleashed unprecedented possibilities across industries fueled by multi-gigabit speeds, massive capacity, and low latency. However, maintaining precise synchronization between network elements has challenged full-scale realization. Legacy wireless systems also face inconsistencies around throughput, resilience, and complexity. The requirement necessitates carrier-grade wireless connectivity to deliver fiber-like consistency combined with agile, scalable deployment models. Furthermore, timing drift errors and synchronization errors between devices are other technical problems with existing wireless communication systems and network architecture. The timing drift errors and synchronization errors between devices increases when additional wireless access points or relay nodes are introduced to extend the communication range.

Furthermore, radio frequency (RF) signals can interfere with each other and with other wireless technologies, such as Wi-Fi® and satellite communications, making TDD synchronization even more challenging in real-world deployments. Buildings, trees, and other obstacles can block some RF signals, particularly higher frequency signals (such as 5G signals), disrupting synchronization signals and making it difficult to provide reliable coverage in dense urban environments. Traditional TDD synchronization methods are not well-suited to addressing the challenges. The traditional TDD synchronization methods are complex and expensive to deploy and may be susceptible to timing drift due to environmental factors and network congestion.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A system and a method for time division duplexing (TDD) synchronization in a wireless network for better synchronization and ultra-reliable communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Figure 1:
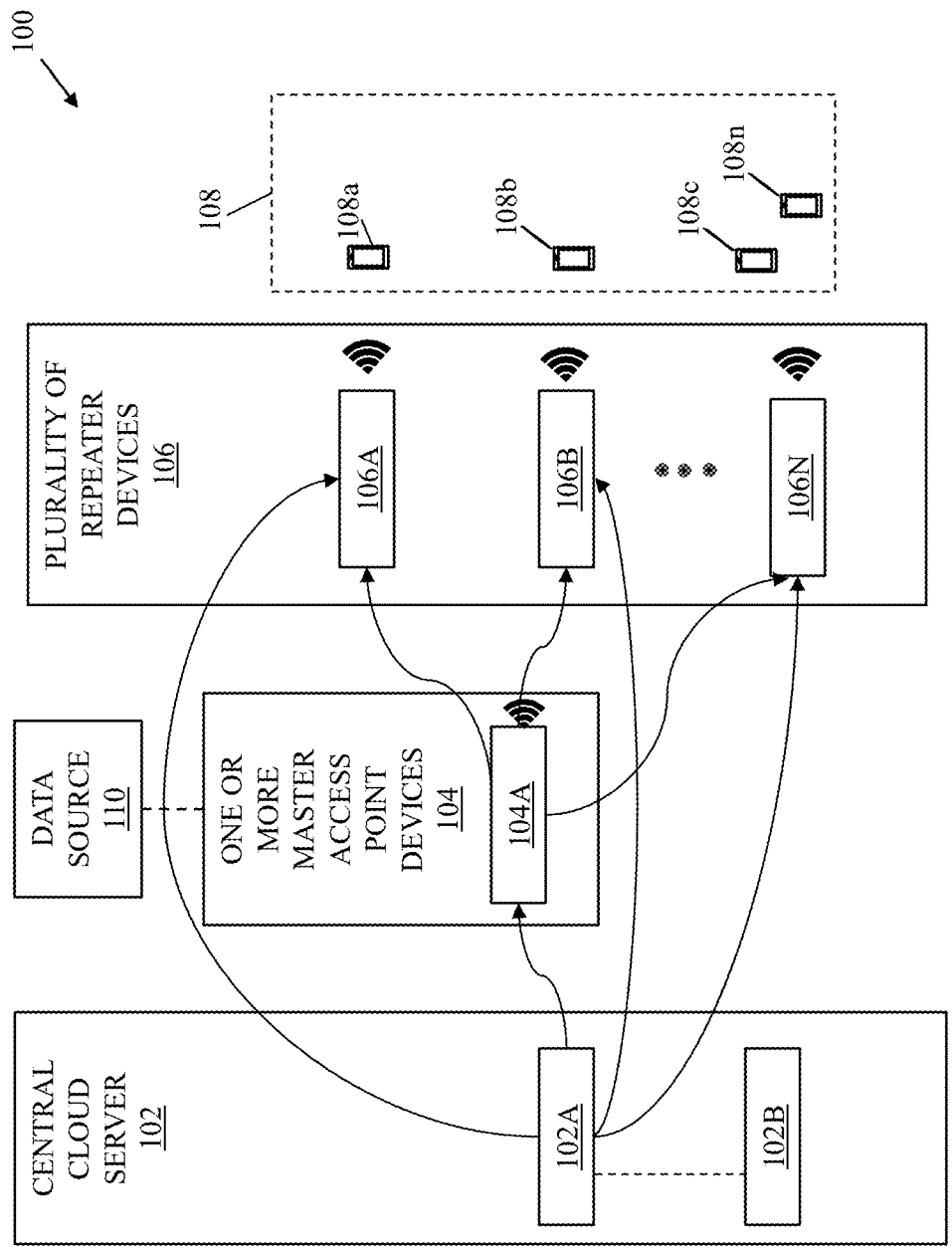
FIG. 1 is a diagram that illustrates an exemplary system for time division duplexing (TDD) synchronization in a wireless network, in accordance with an exemplary embodiment of the disclosure.

Certain embodiments of the disclosure may be found in a system and a method for time division duplexing (TDD) synchronization in a wireless network for better synchronization and ultra-reliable communication. The disclosed embodiments address challenges in maintaining precise timing coordination across multiple network devices, enabling high-performance wireless communication even in challenging environments.

Conventional Wi-Fi® systems may traditionally operate using Carrier Sense Multiple Access with Collision Avoidance (CSMA/CA) in a half-duplex manner where devices may contend for channel access rather than using structured TDD frames. In conventional wireless network systems, maintaining precise TDD synchronization between communication devices for providing peak performance and interference prevention becomes increasingly challenging for various reasons. For example, in a wireless network (e.g., a mesh network) interference from other devices operating in the same frequency band (e.g., 2.4 GHz) can disrupt the transmission of synchronization data. RF signals can interfere with each other and with other wireless technologies, such as Wi-Fi®, making TDD synchronization even more complex in real-world deployments.

The disclosed system includes a master access point device and a plurality of repeater devices, which may correspond to hybrid analog repeater devices using analog signal paths for data propagation, with limited digital processing for synchronization and control. In contrast to conventional wireless systems, the system and method of the present disclosure enables the master access point device to periodically transmit a synchronization signal to one or more repeater devices of the plurality of repeater devices. The one or more repeater devices includes a repeater device that may be configured to receive the synchronization signal, monitor signal quality indicator data associated with the synchronization signal received from the master access point device, filter the signal quality indicator data to remove transient fluctuations indicative of noise, and determine an average from the filtered signal quality indicator data over a predetermined time window. Further, the disclosed system leverages the capabilities of Wi-Fi® 7 modems and certain operations to achieve precise and robust synchronization, minimizing the need for hardware or low-level software modifications.

Furthermore, the plurality of repeater devices may be configured to generate timing adjustment signals when the average of the filtered signal quality indicator data exceeds a predefined threshold. The timing adjustment signals are used to control a TDD switch to generate a TDD signal that toggles between a transmit mode and a receive mode at each repeater device. The system enables adjusting the timing edges of the generated TDD signal based on the timing adjustment signals and the filtered and averaged signal quality indicator data to maintain time synchronization of the repeater device with the master access point device. The master access point device may employ advanced artificial neural network (ANN) models to dynamically determine the TDD pattern and duty cycle in real-time or near real-time network conditions. The intelligent synchronization operation may allow the system to adapt to changing environmental conditions and maintain performance, even when faced with interference, signal blockage, or varying network loads. By utilizing signal quality indicator data as feedback to track timing drift, the system ensures consistent synchronization accuracy that is beneficial for high-throughput, low-latency wireless communication applications, particularly in 5G and emerging 6G networks.

FIG. 1 is a diagram that illustrates an exemplary system for time division duplexing (TDD) synchronization in a wireless network, in accordance with an exemplary embodiment of the disclosure. With reference to FIG. 1, there is shown a system 100 for TDD synchronization in a wireless network. The system 100 may include a central cloud server 102, one or more master access point (MAP) devices 104, and a plurality of repeater devices 106. There is further shown one or more user equipment (UEs) 108 (e.g., UEs 108a, 108b, 108c, . . . , 108n) and a data source 110. The central cloud server 102 may include one or more processors, such as the processor 102A and a trained artificial neural network (ANN) model 102B. The one or more MAP devices 104 and the plurality of repeater devices 106 may be collectively referred to as a plurality of network nodes of a wireless mesh network of the system 100. The central cloud server 102 includes suitable logic, circuitry, and interfaces that may be configured to communicate with the one or more MAP devices 104 and the plurality of repeater devices 106. In an implementation, the central cloud server 102 may be communicatively coupled to each network node (e.g., communicatively coupled to the one or more UEs 110). In an example, the central cloud server 102 may be a remote management server that is managed by a third party different from the service providers associated with the plurality of different wireless carrier networks (WCNs). In another example, the central cloud server 102 may be a remote management server or a data center that is managed by a third party, jointly managed, or managed in coordination and association with one or more of the plurality of different WCNs.

The processor 102A may be further configured to cause each network node of the system 100 to determine location information of a plurality of neighboring network nodes around each network node. Each network node may determine its geo-location and the geo-location of the neighboring nodes. In an implementation, each of the plurality of repeater devices 106 may further include a position sensor (e.g., a gyroscope) or a location sensor (e.g., a global positioning system (GPS) sensor or other geospatial location sensor). In another implementation, each network node may further include Wi-Fi® capability, which may be used, for example, to determine its location coordinates or location coordinates of neighboring nodes (e.g., nearby mesh nodes) by received signal strength indication (RSSI)-based triangulation or WI-FI®-based triangulation process, which is known in the art. Examples of the processor 102A of the central cloud server 102 may include but are not limited to a central processing unit (CPU), a graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The trained ANN model 102B of the central cloud server 102 may be periodically (e.g., daily and for different times-of-day) trained on data points (e.g., different types of synchronization information) uploaded to the central cloud server 102 by each network node, such as the one or more MAP devices 104 and the plurality of repeater devices 106.

The one or more MAP devices 104 includes suitable logic, circuitry, and interfaces that may be configured to provide access to the Internet or wireless backhaul in 5G or 6G networks. Examples of the one or more MAP devices 104 may include, but may not be limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, a network security device, or one or more combinations thereof.

The plurality of repeater devices 106 may correspond to a plurality of hybrid analog-digital repeater devices. The plurality of repeater devices 106 may be disposed as a radio frequency (RF) bridge between a MAP device 104A of the one or more MAP devices 104 and the one or more UEs 108 such that a data propagation path of user data relayed through a network of the plurality of repeater devices 106 is an analog propagation path, without any digital decoding or encoding of the user data in a RF signal to maintain signal integrity and minimize processing delays. The analog propagation path may reduce latency to less than a threshold time. For example, the data propagation path may include high-frequency analog circuitry to minimize latency to nanoseconds. Multi-hop relaying of intermediate frequency signals (e.g., mm Wave signals) may happen without any digital encoding or decoding of the user data (i.e., payload). Further, a backchannel connectivity and control of the network of the plurality of repeater devices 106 may be via a lower WLAN frequency (e.g., 2.4 GHz or 5 Ghz of Wi-Fi® 7 or 8), based on a signal metadata of the incoming RF signal. While the data propagation path may remain entirely analog for lowest latency, the plurality of repeater devices 106 may extract the signal metadata from RF signals for analysis, particularly for TDD synchronization purposes. The extraction of the signal metadata from the RF signals may allow deriving wireless metrics like timing parameters, signal quality indicators, cyclic redundancy check (CRC) errors, error rates, interference levels, channel state information, and reference signals using digital signal processing (DSP) operations. The signal quality indicators are for the TDD synchronization operation as the signal quality indicators provide feedback to track timing drift and maintain time synchronization of a repeater device of the one or more repeater devices of the plurality of repeater devices 106 with the MAP device 104A and with other repeater devices of the one or more repeater devices of the plurality of repeater devices 106. Thus, the simplicity and low latency of analog signal relaying is intelligently combined with digital signal processing capabilities to enable real-time analysis of signal quality indicators, timing parameter extraction, and adaptive synchronization adjustments in a hybrid architecture. The plurality of repeater devices 106 may extend the coverage area of the MAP device 104A, which may allow the plurality of repeater devices 106 to serve UEs corresponding to the plurality of repeater devices 106 in areas that may have poor signal reception while maintaining precise TDD synchronization across the entire network.

Each of one or more UEs 108 may correspond to a wireless device, such as a client device or a telecommunication hardware used by an end-user to communicate. Some of the one or more UEs 108 may refer to a combination of a mobile equipment and subscriber identity module (SIM). Examples of the one or more UEs 108 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

In an implementation, the data source 110 of the MAP device 104A may be one or more of an optical fiber port connected to an optical fiber for an Internet connection, an Ethernet port connected to an Ethernet cable for the Internet connection, or a 5G or 6G mm Wave cellular signal received from a radio access network (RAN) node, or a satellite antenna.

Currently, in WLAN technology, the 2.4 GHz and 5 GHz frequency bands are unlicensed spectrums that are limited and congested and when running high-bandwidth applications, existing Wi-Fi networks inevitably encounter low quality of service (QOS). More advanced WLAN technology like the IEEE 802.11be (Wi-Fi® 7) is being developed with higher data rate capability, such as theoretical capacity of up to 30 Gbps (e.g., assuming ideal conditions like clear line-of-sight, single user, and no interference) while 5-10 Gbps is a more realistic expectation in practical scenarios. There are many factors affecting practical capacity, such as signal interference from nearby devices, appliances, and even weather can disrupt signals, reducing throughput. Furthermore, timing drift errors and synchronization errors between devices are other technical problems with existing wireless communication systems and network architecture. Such timing drift errors and synchronization errors between devices increase when more wireless access points or relay nodes are introduced to extend the communication range. The 5G technology standards for cellular networks have unleashed unprecedented possibilities across industries fueled by multi-gigabit speeds, massive capacity, and low latency. However, maintaining precise synchronization between network elements has challenged full-scale realization. Legacy wireless systems also face inconsistency around throughput, resilience, and complexity, where latency and signal noise are other technical problems with existing wireless communication systems and network architecture.

In contrast to the conventional systems, in the present disclosure, the system 100 intelligently balances the simplicity and low latency of analog signal relaying with the flexibility and intelligence of digital processing in a hybrid architecture with precise TDD synchronization. The hybrid approach with enhanced TDD synchronization may allow to achieve not only the low latency and high efficiency of analog signal relaying but also the flexibility and programmability of digital signal processing while maintaining timing coordination across all network devices. The system 100 of the present disclosure not only improves data transfer rates between at least two communication devices as compared to existing wireless systems (e.g., conventional wireless local area networks (WLANs), Wi-Fi® systems, or traditional Wi-Fi® mesh networks) but also enables almost near zero latency communication with significantly reduced interference, almost zero-collision and an always-connected experience through precise TDD synchronization.

Beneficially, the MAP device 104A may be configured to periodically transmit a synchronization signal to one or more repeater devices of the plurality of repeater devices 106. Each repeater device may be configured to monitor the signal quality indicator data associated with the synchronization signal received from the MAP device 104A. The signal quality indicator data may include at least one of cyclic redundancy check (CRC) error data or error rate data. Each repeater device may include a set of onboard sensors and signal processing components, which may capture and process the signal quality indicator data to enable intelligent TDD synchronization. The plurality of repeater devices 106 may filter the signal quality indicator data to remove transient fluctuations indicative of noise and determine an average from the filtered signal quality indicator data over a predetermined time window. Based on the processed signal quality indicator data, the plurality of repeater devices 106 generate timing adjustment signals when the average exceeds a predefined threshold. The timing adjustment signals are used to control a TDD switch that generates a TDD signal. The TDD signal is used to toggle between a transmit mode and a receive mode at each repeater device of the plurality of repeater devices 106. By adjusting the timing edges of the generated TDD signal based on the timing adjustment signals and the filtered and averaged signal quality indicator data, the system 100 maintains synchronization with the other repeater devices and the MAP device 104A.

In accordance with an embodiment, the plurality of repeater devices 106 may be disposed at a plurality of different locations. A first repeater device (e.g., the repeater device 106A) may be configured to receive signals from the MAP device 104A, including a wireless local area network (WLAN) signal and a synchronization signal. The MAP device 104A may transmit data over a first frequency band (e.g., 5 GHz, 6 GHz, or 7 GHz,) that may be higher than a second frequency band (e.g., 2.4 GHz) used to transmit the synchronization signal to the repeater devices 106. The first repeater device (e.g., the repeater device 106A) may be configured to convert the WLAN signal to a first beam of radio frequency (RF) signal in an intermediate frequency band (e.g., mm Wave frequency range of 24-300 GHz) and may further relay the first beam of RF signals in the intermediate frequency band to one or more second repeater devices (e.g., the repeater devices 106B to 106N) of the plurality of repeater devices 106 under the control of the central cloud server 102. Meanwhile, the synchronization signal may be transmitted on a lower frequency band i.e., the second frequency band (e.g., 2.4 GHz) to ensure reliable delivery of timing information across the network. The first repeater device (e.g., the repeater device 106A) may also be referred to as a root node that may interface the MAP device 104A (i.e., the wireless access point source) and convert the first WLAN signal into intermediate frequency (IF, which may also be referred to as an Internal Frequency) for a beam mesh downstream. Concurrently, the first repeater device 106A may convert the synchronization signal into lower frequency (LF, for example, 2.5 GHz or 5 GHz) and may transmit to the other repeater devices of the one or more repeater devices of the plurality of repeater devices 106. Each repeater device of the plurality of repeater devices 106 may receive the synchronization signals, may extract the timing information, and may regenerate the synchronization signals as needed to maintain precise TDD synchronization across the network. Each of the plurality of repeater devices 106 may be equipped with amplifiers (e.g., power amplifiers) and phase shifters (not shown), which process both the WLAN signals and the synchronization signals to ensure proper timing coordination throughout the extended network.

The use of the plurality of repeater devices 106 may extend the coverage area of the MAP device 104A, which may allow the MAP device 104A to serve UEs in areas that may have poor signal reception or may be located farther away. The extended coverage by the use of the plurality of repeater devices 106 may necessitate precise TDD synchronization across all devices, as timing misalignments may lead to interference and degraded performance throughout the expanded network.

In accordance with an embodiment, the plurality of repeater devices 106 may be disposed as a bi-directional radio frequency (RF) bridge between the MAP device 104A and the UEs 108. The data propagation path of user data relayed through the network may be analog without any digital decoding or encoding of the user data to reduce latency below a threshold time. For example, the data propagation path may include high-frequency analog circuitry to minimize latency to nanoseconds. While the data propagation path may remain entirely analog for lowest latency, the repeater devices 106 may extract signal metadata from RF signals for analysis and synchronization purposes. The extraction of the signal metadata from the RF signals may allow deriving wireless metrics like timing parameters, signal quality indicator data, cyclic redundancy check (CRC) errors, error rates, and reference signals using digital signal processing (DSP) operations.

In accordance with an embodiment, the MAP device 104A may transmit data over the first frequency band that may be higher than the second frequency band over which the MAP device 104A may transmit the synchronization signal to the repeater devices 106. The separation of data and synchronization paths may enable delivery of timing information in various RF environments. Lower frequency signals may have better penetration and coverage, which may make them suitable for synchronization and coordination purposes. The system 100 may leverage lower frequency signals for synchronization to maintain timing coordination throughout the network while supporting data transmission over higher frequency bands. The design of the system 100 may enhance network stability and reliability in environments with potential interference or signal blockages.

In accordance with an embodiment, the first repeater device 106A may receive the synchronization signal from the MAP device 104A. The synchronization signal may contain timing information that enables coordination between the transmit and receive modes of all devices in the system 100. The first repeater device 106A may receive the synchronization signal through its receiving antenna, which may be configured to detect signals in the frequency band used by the MAP device 104A for synchronization transmission. The reception of synchronization signals may occur in parallel with data transmission operations, which may allow the plurality of repeater devices 106 to maintain normal network operation while continuously updating their timing information.

In accordance with an embodiment, the first repeater device 106A may be configured to extract a TDD pattern and a duty cycle from the synchronization signal. The TDD pattern defines a predetermined sequence of transmit and receive time slots, while the duty cycle represents a ratio of time allocated to transmission versus reception. The extraction process may include demodulation of the synchronization signal to retrieve the embedded timing parameters. The first repeater device 106A may use a dedicated signal processor to decode the received synchronization signal. The dedicated signal processor may identify specific markers that indicate where the TDD pattern and duty cycle information is located within the signal. In some embodiments, the TDD pattern and duty cycle information may be encoded using error correction codes to ensure reliable extraction even in challenging RF environments. By extracting the TDD pattern and duty cycle information, the first repeater device 106A may properly align its transmission and reception windows with the MAP device 104A and the other repeater devices of the one or more repeater devices of the plurality of repeater devices 106 in the network, ensuring coordinated network-wide communication without collisions.

In accordance with an embodiment, the first repeater device 106A may be configured to monitor signal quality indicator data derived from the synchronization signal that is received from the MAP device 104A. The signal quality indicator data may provide information about the reliability and integrity of the received synchronization signal. The first repeater device 106A may monitor the signal quality indicator data to assess whether the received timing information is accurate or potentially corrupted. The monitoring operation may include continuous measurement of pre-defined signal parameters during and after reception of the synchronization signal. The first repeater device 106A may utilize dedicated hardware components or software operation to perform real-time analysis of the received signal characteristics. In some embodiments, the first repeater device 106A may perform the monitoring operation of the signal quality indictor data on both the primary synchronization signal and any redundant synchronization information to provide a more robust assessment of signal quality. The first repeater device 106A may monitor the signal quality indicator data at regular intervals, which are synchronized with the transmission schedule of the synchronization signals from the MAP device 104A. The synchronized intervals may allow for consistent measurement of signal quality over time.

In accordance with an embodiment, the signal quality indicator data may include at least one of cyclic redundancy check (CRC) error data or error rate data. CRC error data may be derived to perform a cyclic redundancy check calculation on the received synchronization signal and comparison of the result with a predetermined reference value (e.g., a defined value) embedded in the signal itself. The comparison may indicate whether any bits in the synchronization signal have been corrupted during transmission. Error rate data may represent the ratio of erroneous bits to total bits received over a defined time period that may provide a statistical measure of transmission reliability. The first repeater device 106A may calculate the bit error rate to compare the received bit sequence with known reference patterns in the synchronization signal or through error detection codes embedded within the synchronization signal. In some embodiments, the first repeater device 106A may utilize forward error correction (FEC) decoding success rates as an additional quality indicator. Higher CRC errors or error rates may indicate degradation in the synchronization signal quality, which may lead to timing misalignments if not addressed. The CRC error data and the error rate data may be particularly valuable for adapting to changing RF conditions that affect synchronization accuracy. For example, the CRC error data may be calculated by performing a 32-bit cyclic redundancy check on received synchronization packets. If 8 out of 1000 received packets contain CRC errors, the CRC error rate would be 0.8%. Similarly, error rate data may be calculated by comparing received bit sequences with expected patterns. If 15 bits out of 10,000 transmitted bits are received incorrectly, the bit error rate would be $1.5 \times 10^{-3}$. The first repeater device 106A may continuously monitor the CRC error data and the error rate data and may update the calculations every predetermined time interval such as every 1-5 seconds to provide real-time assessment of synchronization signal quality.

In accordance with an embodiment, the first repeater device 106A may be configured to filter the signal quality indicator data to remove transient fluctuations indicative of noise in the signal quality indicator data. In the context of CRC error data and error rate data, the noise may refer to anomalous spikes or temporary deviations in error measurements that do not reflect the actual underlying synchronization signal quality but are instead caused by momentary environmental factors such as brief electromagnetic interference from nearby electronic devices, temporary multipath propagation effects caused by moving objects like vehicles or people, atmospheric conditions affecting signal propagation, or instantaneous RF congestion from other wireless devices operating in the same frequency band. The noise-induced fluctuations may manifest as sudden increases in CRC error rates or temporary degradation in error rate measurements that quickly return to normal baseline levels, distinguishing the noise induced fluctuations from persistent degradation that may indicate actual synchronization signal problems. Filtering may be necessary because instantaneous signal quality measurements may be affected by momentary interference, multipath fading, or other temporary RF disturbances that do not represent the true synchronization signal quality trend. The filtering process may employ digital filtering operations, such as moving average filters, median filters, or Kalman filters to smooth out rapid variations while preserving meaningful trends in the signal quality data. The first repeater device 106A may implement the filtering operations in its digital signal processor or dedicated synchronization management unit. In some embodiments, the filtering parameters such as filter window size or filter coefficients may be dynamically adjusted based on the observed noise characteristics of the environment. For example, in environments with frequent but brief interference pulses, a median filter may be more effective, while slowly varying interference might be better addressed with an exponential moving average filter. The filtering step may ensure that the first repeater device 106A does not make unnecessary timing adjustments based on anomalous or non-representative signal quality measurements. For example, if instantaneous CRC error rate measurements show values of 2%, 15%, 3%, 1%, 4% over five consecutive measurement intervals, a median filter would select 3% as the representative value, effectively removing the anomalous 15% spike that might have been caused by temporary interference.

In accordance with an embodiment, following the filtering process, the first repeater device 106A may be configured to determine, over a predetermined time window, an average from the filtered signal quality indicator data. For example, when the filtered signal quality indicator data includes CRC error rate measurements collected every 10 milliseconds over a 1-second predetermined time window, the first repeater device 106A may determine an average from the CRC error measurements using a rolling average approach. In an exemplary scenario, if the first repeater device 106A collects the first 10 CRC error rate measurements with values of 1.2%, 1.5%, 2.1%, 1.8%, 2.3%, 1.9%, 1.7%, 2.0%, 1.6%, and 1.4%, the first repeater device 106A calculates an initial average of 1.75% (sum of 17.5% divided by 10 measurements). As the rolling average process continues, when the 11th measurement of 1.3% arrives, the first repeater device 106A removes the oldest measurement (1.2%) and adds the new measurement (1.3%), resulting in a new set of values: 1.5%, 2.1%, 1.8%, 2.3%, 1.9%, 1.7%, 2.0%, 1.6%, 1.4%, 1.3%, which yields an updated average of 1.76%. The rolling average calculation may continuously update the average as each new CRC error measurement becomes available, which may maintain a sliding window of the most recent hundred measurements and providing a current assessment of synchronization signal quality based on recent trends.

The determination of the average may provide a more stable and representative measure of synchronization signal quality by accumulating multiple filtered measurements over time. The predetermined time window may be selected based on network characteristics such as synchronization signal transmission frequency and expected rate of change in RF conditions. The first repeater device 106A may calculate the average using arithmetic mean, weighted average, or other statistical aggregation operations. In some embodiments, the time window may be adaptive, automatically adjusting its duration based on the stability of the filtered signal quality data. For example, highly stable environments may use longer averaging windows to maximize noise rejection, while rapidly changing environments may use shorter windows to improve responsiveness. The averaging process may be performed continuously as new filtered data becomes available, maintaining a rolling average that reflects recent signal quality trends while minimizing the impact of any remaining noise that passed through the filtering stage. For example, the predetermined time window may range from 100 milliseconds to 10 seconds depending on network stability requirements. In stable environments, a longer time window of 5-10 seconds may be used to maximize accuracy, while dynamic environments may use shorter windows of 100-500 milliseconds for faster response.

In accordance with an embodiment, the first repeater device 106A may be configured to generate timing adjustment signals based on the average that exceeds a defined threshold. The timing adjustment signals may serve as control commands that trigger modifications to the TDD switching timing to maintain synchronization across the network. The defined threshold may represent a tolerable level of signal quality degradation beyond which timing adjustments become necessary to prevent synchronization drift. The generation of the timing adjustment signals may include comparison of the calculated average against the defined threshold and producing a digital control signal when the defined threshold is crossed. The timing adjustment signals may include information about both the magnitude and direction of the required timing adjustment. In some embodiments, the timing adjustment signals may be generated with different urgency levels that may depends on how significantly the average exceeds the defined threshold that may allow for proportional responses to different degrees of synchronization issues. For example, minor threshold violations may generate small, incremental timing adjustments, while major violations may trigger more substantial corrections. The threshold-based approach may prevent unnecessary timing adjustments due to minor signal fluctuations while ensuring prompt response to significant synchronization deviations. For example, the defined threshold may be set to values such as $10^{-3}$ for bit error rate or 5% for CRC error rate in typical network conditions. The specific defined threshold value depends on the type of signal quality indicator data being processed by the first repeater device 106A. In high-interference environments, the threshold may be adjusted to $10^{-2}$ for bit error rate to prevent unnecessary adjustments due to environmental noise. For example, if the signal quality indicator data includes CRC error data, then the defined threshold is set for CRC error rate (e.g., 5%). If the signal quality indicator data includes bit error rate data, then the defined threshold is set for the bit error rate (e.g., $10^{-3}$).

In accordance with an embodiment, the first repeater device 106A may be further configured to adjust the predefined threshold for the generation of the timing adjustment signals based on a historical pattern in the signal quality indicator data. The adaptive adjustment of the predefined threshold may allow the system 100 to optimize its sensitivity to signal quality variations based on the specific characteristics of its operating environment. The first repeater device 106A may analyze stored historical signal quality data to identify patterns such as cyclical variations, gradual trends, or correlation with specific events or time periods. Based on the analysis of the historical signal quality data, the first repeater device 106A may dynamically modify the predefined threshold value to maintain appropriate sensitivity regardless of modification of environmental conditions. In some embodiments, machine learning operations such as pattern recognition or regression analysis may be employed to predict threshold values based on observed historical data. For example, if historical data indicates that certain times of day consistently experience higher signal quality variations without actual synchronization issues, the predefined threshold may be temporarily increased during those periods to avoid unnecessary adjustments. The adaptive approach of adjusting the predefined threshold may improve system stability by reduction of false triggers and continued responsiveness to genuine synchronization problems.

In accordance with an embodiment, the first repeater device 106A may be configured to control, based on the timing adjustment signals, a TDD switch to generate a TDD signal. The TDD switch may be an electronic component or circuit that routes RF signals either to the transmitter or receiver sections of the first repeater device 106A. The generated TDD signal may be a digital control waveform with precise timing that may determine when the first repeater device 106A may transmit and when the first repeater device 106A may receive. The control of the TDD switch may include translation of the timing adjustment signals into specific modifications of the timing parameters of the TDD signal, such as phase adjustments, pulse width modifications, or frequency corrections. The first repeater device 106A may implement the control of the TDD switch through a dedicated timing control unit that interfaces directly with the TDD switch hardware. In some embodiments, the control of the TDD switch may include a prediction operation that may anticipate required timing changes based on trends in the adjustment signals and may provide more stable switching behavior. The TDD signal generation may also incorporate hysteresis operation to prevent rapid oscillation between timing states when the quality indicators hover near the threshold values. The precise control of the TDD switch may ensure that the plurality of repeater devices 106 in the network maintain coordinated transmission and reception windows and may prevent collisions and interference.

In accordance with an embodiment, the first repeater device 106A may be configured to adjust timing edges of the generated TDD signal based on the timing adjustment signals and the filtered and averaged signal quality indicator data to maintain time synchronization of the first repeater device 106A with the MAP device 104A. Timing edges refer to the transition points in the TDD signal where the first repeater device 106A switches between transmit and receive modes. The adjustment of the timing edges may involve subtle phase shifts, advancing or delaying the transitions by precise time increments to align with the network-wide synchronization framework. The first repeater device 106A may implement the adjustments of the timing edges through digital delay lines, programmable oscillators, or phase-locked loops that may produce finely calibrated timing modifications. The magnitude and direction of the timing edge adjustments may be determined through a combination of the timing adjustment signals and analysis of patterns in the filtered and averaged signal quality data. In some embodiments, the adjustment process may employ predictive operations that anticipate drift patterns based on historical data, allowing for preemptive corrections before synchronization errors become significant. For example, if a consistent drift pattern is detected, the timing adjustment may include a compensatory component that counteracts the expected future drift. The proactive adjustment of timing edges may maintain precise network-wide synchronization even in challenging environments with varying propagation delays or interference patterns.

In accordance with an embodiment, the first repeater device 106A may be further configured to toggle between a transmit mode and a receive mode based on the generated TDD signal with the adjusted timing edges. The TDD signal may serve as a control signal that determines when the first repeater device 106A transitions from transmit mode to receive mode and vice versa. The adjusted timing edges may provide precise control over the switching boundaries to maintain proper synchronization with the network timing structure. During the transmit mode, the first repeater device 106A may activate transmit circuitry while disabling receive operations to prevent self-interference and signal leakage. Conversely, during the receive mode, the first repeater device 106A may activate receive circuitry while placing the transmit circuitry in an inactive state. The switching operation may be implemented through RF switches, antenna switching matrices, or separate transmit and receive antenna systems controlled by the TDD signal timing. For example, if the TDD signal indicates a transmit period from time slots 1-3 and a receive period from time slots 4-6 within a 10-millisecond frame, the first repeater device 106A may precisely switch modes at the adjusted timing edges to maintain synchronization. The mode transitions may include guard periods of 10-50 microseconds between transmit and receive periods to account for RF switching delays and prevent signal overlap that could cause interference or signal corruption.

In accordance with an embodiment, the first repeater device 106A may be configured to maintain time synchronization of the first repeater device 106A with the other repeater devices of the one or more repeater devices of the plurality of repeater devices 106 and with the MAP device 104A. The time synchronization may be enabled through a coordinated timing synchronization process. Each repeater device of the one or more repeater devices may receive the same synchronization signal from the MAP device 104A and implement similar signal quality monitoring, filtering, and timing adjustment operations to maintain network-wide timing coherence. The synchronization process may ensure that the one or more repeater devices transition between transmit and receive modes at substantially the same time instant. The same time instant transition of the one or more repeater devices between transmit and receive modes may prevent cross-link interference that may occur if one repeater device transmits while another attempts to receive on the same frequency. The MAP device 104A may broadcast the synchronization signal that may provide a common time base for each of the other repeater devices, while each repeater device may independently track and correct for timing drift using the respective signal quality indicator data. For example, if the network includes five repeater devices distributed across a coverage area, the five repeater devices may switch to transmit mode during time slots 1-4 and to receive mode during time slots 5-8 based on individually adjusted TDD signals of each of the five repeater devices that maintain synchronization with the common network timing. The coordinated synchronization may prevent the base station-to-base station interference scenarios where one repeater device's downlink transmission interferes with another repeater device's uplink reception, maintaining network performance and signal quality across the entire coverage area.

In accordance with an embodiment, the first repeater device 106A may be further configured to monitor an error pattern in the average of the filtered signal quality indicator data over time. Error pattern monitoring may involve analyzing temporal characteristics and trends in the signal quality indicator data rather than just instantaneous values. The error patterns may reveal systematic issues affecting synchronization that might not be apparent from individual measurements. The monitoring may include recordal of sequences of averaged signal quality values and application of pattern recognition operation to identify recurring features, gradual trends, or correlations with network events. The first repeater device 106A may implement the monitoring by use of dedicated memory buffers to store historical data and specialized analysis routines that operate on the stored information. For example, a regularly recurring spike in error rates may indicate an intermittent interference source with a predictable duty cycle, while a gradual increase in average error rates may suggest progressive desynchronization requiring correction. The detailed pattern analysis may provide deeper insights into synchronization issues than simple threshold-based detection alone.

In accordance with an embodiment, the first repeater device 106A may be further configured to determine a direction of a timing drift between the TDD signal of the first repeater device 106A and the synchronization signal from the MAP device 104A based on the monitored error pattern for the adjustment of the timing edges of the TDD signal. The direction of timing drift may indicate whether the repeater's TDD switching is occurring too early (leading) or too late (lagging) relative to the MAP device 104A. The directional information may be used for applying the correct compensatory adjustments. The determination process may involve analyzing the relationship between error patterns and timing parameters to identify correlations that reveal drift direction. For example, if errors increase when the first repeater device 106A may attempt to receive during what should be a transmit window, the first repeater device 106A may indicate a lagging drift requiring forward adjustment. The first repeater device 106A may implement a correlation operation that compares error rates with timing parameters to extract directional information. In some embodiments, the first repeater device 106A may intentionally introduce small, calibrated timing variations and observe their effect on error patterns to more definitively determine drift direction. For instance, the first repeater device 106A may slightly advance its timing and observe whether error rates improve or worsen, then make a similar test with delayed timing, comparing the results to determine the direction for adjustment. The directional awareness may enable precise and efficient timing corrections that quickly restore synchronization with minimal disruption to network operation.

In accordance with an embodiment, the first repeater device 106A may be configured to utilize the signal quality indicator data as a feedback to track a timing drift in the TDD signal to maintain the time synchronization of the first repeater device 106A with the MAP device 104A. The feedback may create a self-regulating system that may continuously or periodically correct timing deviations, similar to a phase-locked loop in electronic circuits. The signal quality indicator data feedback may establish a correlation between changes in signal quality metrics and timing adjustments, and may utilize the correlation between changes in signal quality metrics and timing adjustments to guide continuous fine-tuning of the TDD signal timing. The first repeater device 106A may implement the signal quality indicator data feedback through an adaptive operation that iteratively adjusts timing parameters in response to signal quality measurements, and may seek to optimize quality metrics. In some embodiments, the feedback may employ predictive models that learn from historical drift patterns to anticipate and compensate for expected timing deviations before the expected timing deviations significantly impact performance. For example, if the self-regulating system observes that temperature increases consistently correlate with accelerated timing drift in a particular direction, the first repeater device 106A may proactively adjust timing to compensate when temperature sensors indicate warming conditions. The continuous feedback-based signal quality indicator data feedback may maintain precise synchronization despite various factors that could cause timing drift, such as temperature variations, component aging, or changes in network topology.

In accordance with an embodiment, the MAP device 104A may be configured to dynamically determine each of a TDD pattern and a duty cycle in a real-time network condition or a near real-time network condition based on the trained ANN model 102B, and insert the TDD pattern and the duty cycle in the synchronization signal. The trained ANN model 102B may analyze multiple network parameters such as traffic patterns, device distribution, interference levels, and quality of service requirements to optimize the TDD configuration. The determination of the TDD pattern and the duty cycle may allow the network to adapt its timing structure to changing conditions rather than operating with static, predefined patterns. The MAP device 104A may use the trained ANN model 102B, which may continuously process network telemetry data to generate TDD parameters. In some embodiments, the trained ANN model 102B may be periodically retrained with updated network performance data to improve its optimization capabilities over time. For example, if network traffic patterns show distinct variations between daytime and nighttime usage, the ANN may develop different TDD patterns for the predefined periods. The dynamic TDD patterns and duty cycles may be encoded into the synchronization signal using predefined fields or markers that the plurality of repeater devices 106 are configured to recognize and extract. The adaptive approach to TDD pattern generation may maximize network efficiency by allocating appropriate transmission and reception windows based on actual network needs rather than static assumptions. The trained ANN model 102B may process multiple input parameters to determine optimal TDD patterns, including network traffic patterns (such as peak usage during 9 AM-5 PM requiring 70% transmit duty cycle versus off-peak hours requiring 40% transmit duty cycle), device density (networks with more than 10 active repeaters may require shorter time slots of 1-2 milliseconds compared to 5-10 milliseconds for smaller networks), and interference levels (high-interference environments may necessitate more frequent synchronization signal transmissions every 50-100 milliseconds instead of the standard 200-500 milliseconds). The trained ANN model 102B may be retrained weekly using performance metrics such as packet delivery ratio, average latency, and synchronization accuracy to continuously improve its optimization capabilities.

In accordance with an embodiment, the MAP device 104A may be further configured to update the TDD pattern and the duty cycle based on a number of active repeater devices from the plurality of repeater devices 106 and geographic distribution of the active repeater devices. The update process may optimize network timing based on geographic awareness of the physical topology of the network, accounting for propagation delays and coverage requirements. The update process may involve analyzing the network connectivity data, signal strength measurements between devices, and location information to determine an optimal timing structure for the current network configuration. The MAP device 104A may maintain a dynamic topology map of the network that tracks which of the plurality of repeater devices 106 are active and their relative positions or connection paths. In some embodiments, the updating operation may employ graph theory or network optimization operations to calculate timing patterns that minimize interference while maximizing coverage and throughput. For example, if a first set of repeater devices from the plurality of repeater devices 106 are concentrated in one geographic area with few devices in another area, the TDD pattern may be adjusted to allocate more transmission time to the densely populated sector. Similarly, if a second set of repeater devices from the plurality of repeater devices 106 are arranged in a linear chain rather than a star topology, the TDD pattern may be optimized for sequential relay operations. The topology-aware updating process may ensure that the TDD pattern remains optimal as repeater devices are added, removed, or relocated within the network coverage area. The geographic distribution may directly impact TDD pattern optimization through propagation delay considerations and coverage requirements. For example, if a third set of repeater devices from the plurality of repeater devices 106 are distributed linearly along a 2-kilometer corridor with 200-meter spacing, the MAP device 104A may configure sequential TDD patterns where each repeater device transmits in turn (e.g., repeater 1 transmits during time slot 1, repeater 2 during time slot 2, etc.) to minimize interference between adjacent devices. The timing slots may be calculated based on signal propagation delays, where each 200-meter distance introduces approximately 0.67 microseconds of delay. In contrast, if a fourth set of repeater devices from the plurality of repeater devices 106 are clustered in a star topology within a 500-meter radius, the MAP device 104A may implement a synchronized TDD pattern where all repeater devices in the same sector transmit concurrently, while the other repeater devices of the plurality of repeater devices 106 in different sectors use alternating time slots. For dense urban deployments with a fifth set of repeater devices from the plurality of repeater devices 106 in a grid pattern (e.g., 100-meter spacing in a 1 km×1 km area), the system 100 may create zone-based TDD patterns where the other repeater devices of the plurality of repeater devices 106 in alternate zones (checkerboard pattern) transmit during different time slots to prevent co-channel interference. The duty cycle allocation may also vary based on geography: linear deployments may use 50% transmit/50% receive cycles, while clustered deployments may optimize for 30% transmit/70% receive to accommodate higher interference potential.

In accordance with an embodiment, the first repeater device 106A may be further configured to identify, based on the monitored signal quality indicator data associated with the synchronization signal, an interference pattern in the synchronization signal or a degradation in link quality of the synchronization signal using the trained ANN model 102B. Interference patterns may include recurring disruptions from other RF sources, while link quality degradation may result from environmental factors, obstacles, or equipment issues. The identification process may involve analysis of temporal and spectral characteristics of the signal quality data to recognize signatures of specific interference types or degradation operation. The first repeater device 106A may implement the identification of the interference pattern by use of a dedicated machine learning processor running the trained ANN model 102B, which classifies observed signal quality patterns into recognized categories of interference or degradation. In some embodiments, the trained ANN model 102B may be trained on a library of known interference signatures and their corresponding signal quality effects, enabling the trained ANN model 102B to recognize both common and rare disruption types. For example, the trained ANN model 102B may distinguish between periodic interference from a rotating radar, burst interference from microwave ovens, or gradual degradation due to weather conditions based on their unique signatures in the signal quality indicator data. The intelligent identification may enable more targeted and effective mitigation strategies than would be possible with simple threshold-based detection methods. The trained ANN model 102B may be trained on diverse interference signatures that constitute specific patterns in the signal quality indicator data. For example, microwave oven interference may exhibit a characteristic signature of periodic 50-60 Hz bursts lasting 8-10 milliseconds with signal degradation of 15-25 dB during active periods. Radar interference may show regular sweeping patterns with 2-5 second intervals and brief 10-50 millisecond pulses causing 20-30 dB signal drops. Weather-related degradation may manifest as gradual signal quality decline over 10-30 minute periods with 5-15 dB attenuation. The training dataset may include thousands of samples for each interference type, with corresponding signal quality measurements including CRC error rates, received signal strength indicator (RSSI) values, signal-to-noise ratio (SNR) measurements, and timing jitter characteristics. Each interference signature may be labeled with its source type, frequency characteristics, temporal patterns, and effective mitigation strategies, enabling the trained ANN model 102B to recognize and classify new interference instances with 85-95% accuracy.

In accordance with an embodiment, the first repeater device 106A may be further configured to switch from a first polarization state to a second polarization state based on the identified interference pattern or the degradation in the link quality. Polarization states refer to the orientation of the electromagnetic waves used for transmission and reception. Common polarization states include vertical, horizontal, and circular polarizations. The transition between polarization states may allow the first repeater device 106A to avoid interference that predominantly affects a particular polarization. The polarization state transition process may involve electronically reconfiguring the antenna elements or RF front-end components to change the polarization orientation of transmitted and received signals. The first repeater device 106A may implement the polarization state transition operation through electronically controlled polarization switching circuits that can rapidly transition between different polarization configurations. In some embodiments, the polarization state transition may be gradual or partial, creating mixed polarization states optimized for the specific interference conditions. For example, if interference is detected primarily in vertical polarization, the first repeater device 106A may switch to horizontal or right-hand circular polarization to maintain link quality. The adaptive polarization capability may provide an additional dimension of flexibility in managing interference, complementing other mitigation operations such as frequency selection or power adjustment.

In accordance with an embodiment, the first repeater device 106A may be further configured to determine, based on an output from the trained ANN model 102B, a beam direction or a polarization configuration to mitigate the identified interference pattern or the degradation in the link quality. Beam direction refers to the spatial orientation of the transmitted or received RF energy, while polarization configuration encompasses both the type and orientation of polarization used. The determination of the beam direction may involve correlating interference characteristics with RF parameters to identify the configuration that may overcome the current challenges. The first repeater device 106A may implement the determination of the beam direction through input of the interference classification from the trained ANN model 102B into a decision operation that maps interference types to optimized RF configurations. In some embodiments, the first repeater device 106A of the plurality of repeater devices 106 may maintain a database of historical performance data that records the effectiveness of different beam directions and polarization configurations against various interference patterns, continuously refining its selection strategy based on observed results. For example, if the trained ANN model 102B identifies interference consistent with a nearby Wi-Fi router, the first repeater device 106A may select a beam direction that minimizes overlap with the interferer's location and a polarization configuration orthogonal to the interferer's polarization. The intelligent adaptation of RF parameters may maximize link quality even in complex interference environments with multiple potential disruption sources. For example, if the trained ANN model 102B detects interference originating from a specific geographic direction (such as 45 degrees azimuth from the repeater's position), the first repeater device 106A may steer the beam away from that direction and toward a cleaner signal path (such as 120 degrees azimuth). The beam steering may involve adjusting the phase relationships of antenna elements to create a radiation pattern with nulls pointing toward interference sources and main lobes pointing toward desired signal directions. In a practical scenario, if a Wi-Fi router located at bearing of 30 degrees is causing interference, the first repeater device 106A may steer the synchronization signal reception beam towards a bearing of 150 degrees, where the MAP device 104A is located, while concurrently creating a null at 30 degrees to reject the interference. The spatial filtering approach may improve signal-to-interference ratio by 10-20 dB, significantly enhancing synchronization signal quality.

In accordance with an embodiment, the first repeater device 106A may include one or more dual-polarized high-gain phased antenna arrays configured to dynamically steer a beam of RF signals based on the beam direction or the polarization configuration to maintain a reception of the synchronization signal from the MAP device 104A as well as data communication with other repeater devices of the plurality of repeater devices 106. The one or more dual-polarized high-gain phased antenna arrays may concurrently support two orthogonal polarizations (typically vertical and horizontal), while phased arrays enable electronic beam steering without physical movement of the antennas. The one or more dual-polarized high-gain phased antenna arrays may concentrate RF energy in specific directions to increase effective range and reduce susceptibility to interference from other directions. In some embodiments, the one or more dual-polarized high-gain phased antenna arrays may support multiple concurrent beams pointing in different directions, allowing the first repeater device 106A to maintain connections with multiple network nodes concurrently. For example, the first repeater device 106A may direct a narrow beam toward the MAP device 104A for reliable synchronization signal reception while concurrently maintaining broader beams toward clusters of the other repeater devices for data distribution. The one or more dual-polarized high-gain phased antenna arrays may be controlled by dedicated beam management processors that translate the predefined beam direction and polarization configuration into specific phase and amplitude settings for each antenna element. The one or more dual-polarized high-gain phased antenna arrays may provide the spatial filtration needed to maintain reliable synchronization and data connectivity even in dense, interference-rich environments. The beam management processors may implement real-time beamforming operations that calculate optimal phase and amplitude coefficients for each antenna element based on current interference conditions. For example, in a 16-element phased array, the beam management processor may adjust phase values ranging from 0 to 360 degrees for each element to create a beam with 15-20-degree beamwidth pointing toward the MAP device 104A while maintaining side lobe levels below −20 dB to suppress interference from other directions. The dynamic steering capability may respond to interference changes within 10-50 milliseconds, automatically adjusting beam patterns to maintain synchronization signal quality above predetermined thresholds (such as SNR >15 dB or bit error rate <$10^{-4}$).

In accordance with an embodiment, the training of the trained ANN model 102B may be executed using semi-supervised or supervised learning with comprehensive training datasets that may include synchronized network performance metrics collected from the one or more MAP devices 104 and the plurality of repeater devices 106 during various network conditions and operational states. The training data may encompass signal quality indicator measurements including CRC error rates, error pattern data, timing drift measurements, interference patterns, and corresponding network topology configurations collected across diverse environmental conditions, geographic distributions, and temporal variations. The input data includes associated measurement pairs actually determined from the plurality of repeater devices 106 of different hardware configurations, signal propagation environments, network loads, and interference scenarios, ensuring the trained ANN model 102B learns robust correlations between network conditions and optimal TDD synchronization parameters. The training samples may be systematically collected during controlled network scenarios where ground truth optimal TDD patterns, duty cycles, and timing adjustments may be predetermined (e.g., through expert analysis) to create labeled datasets that associate specific network state vectors (including signal quality metrics, repeater geographical data, network topology information, and temporal patterns) with corresponding optimal synchronization configurations and adaptive responses.

In accordance with an embodiment, the trained ANN model 102B may employ population-based training to jointly optimize network parameters and hyperparameters including learning rate scheduling, batch size optimization, regularization coefficients, and architectural parameters such as hidden layer dimensions and activation functions. The useful hyperparameters may include learning rate values that may control convergence speed toward optimal TDD pattern prediction accuracy, batch sizes that balance training efficiency with gradient estimation quality, dropout rates for preventing overfitting to specific network configurations, and optimizer selection (such as Adam or RMSprop) for stable convergence during training on diverse network scenarios. The model architecture may include input layers configured to receive multi-dimensional network state vectors, hidden layers with sufficient capacity to capture complex relationships between network conditions and synchronization requirements, and output layers that generate probabilistic distributions over TDD pattern selections, duty cycle adjustments, and timing correction parameters. The trained model outputs may include weighted predictions for optimal TDD pattern configurations, confidence scores for synchronization parameter adjustments, and adaptive threshold values for dynamic network response, enabling the system 100 to maintain sub-microsecond synchronization accuracy and accommodate frequency drifts up to ±50 parts per billion across varying network topologies and interference conditions.

In accordance with an embodiment, the trained ANN model 102B may employ deep neural network architectures with hidden layers configured to learn complex non-linear relationships between network conditions and optimal synchronization parameters. The model training may utilize hyperparameter optimization operation that may include learning rate scheduling with initial rates of 0.001-0.01, batch size optimization ranging from 32-256 samples, and dropout regularization with rates of 0.1-0.5 to prevent overfitting to specific network configurations. The trained ANN model 102B may implement gradient descent optimization, such as Adam or RMSprop that may provide stable convergence during training on diverse network scenarios encompassing different geographic topologies, interference environments, and traffic patterns. In accordance with an embodiment, the first repeater device 106A may implement online learning capabilities where the trained ANN model 102B may continuously or periodically update its parameters based on real-time performance feedback. The processor 102A may collect performance metrics including synchronization accuracy measurements, interference detection results, and signal quality trends that may be used to fine-tune the model parameters during operational deployment from the plurality of repeater devices 106. The trained ANN model 102B may implement incremental learning that may adapt to changing network conditions without requiring complete retraining, enabling the system 100 to optimize performance for local environmental characteristics. The model adaptation process may utilize reinforcement learning operations where successful synchronization maintenance actions may be rewarded while actions leading to timing drift or interference may be penalized through feedback. The real-time learning capability may enable the system 100 to automatically discover optimal synchronization strategies for previously unseen network configurations or interference patterns.

In accordance with an embodiment, the system 100 may support scalable deployment configurations ranging from 2 to 1000 repeater devices without degrading sub-microsecond synchronization accuracy. The trained ANN model 102B may implement hierarchical network organization that may partition large networks into synchronized clusters of 10-50 devices each, with inter-cluster coordination maintaining overall network timing coherence.

Figure 2:
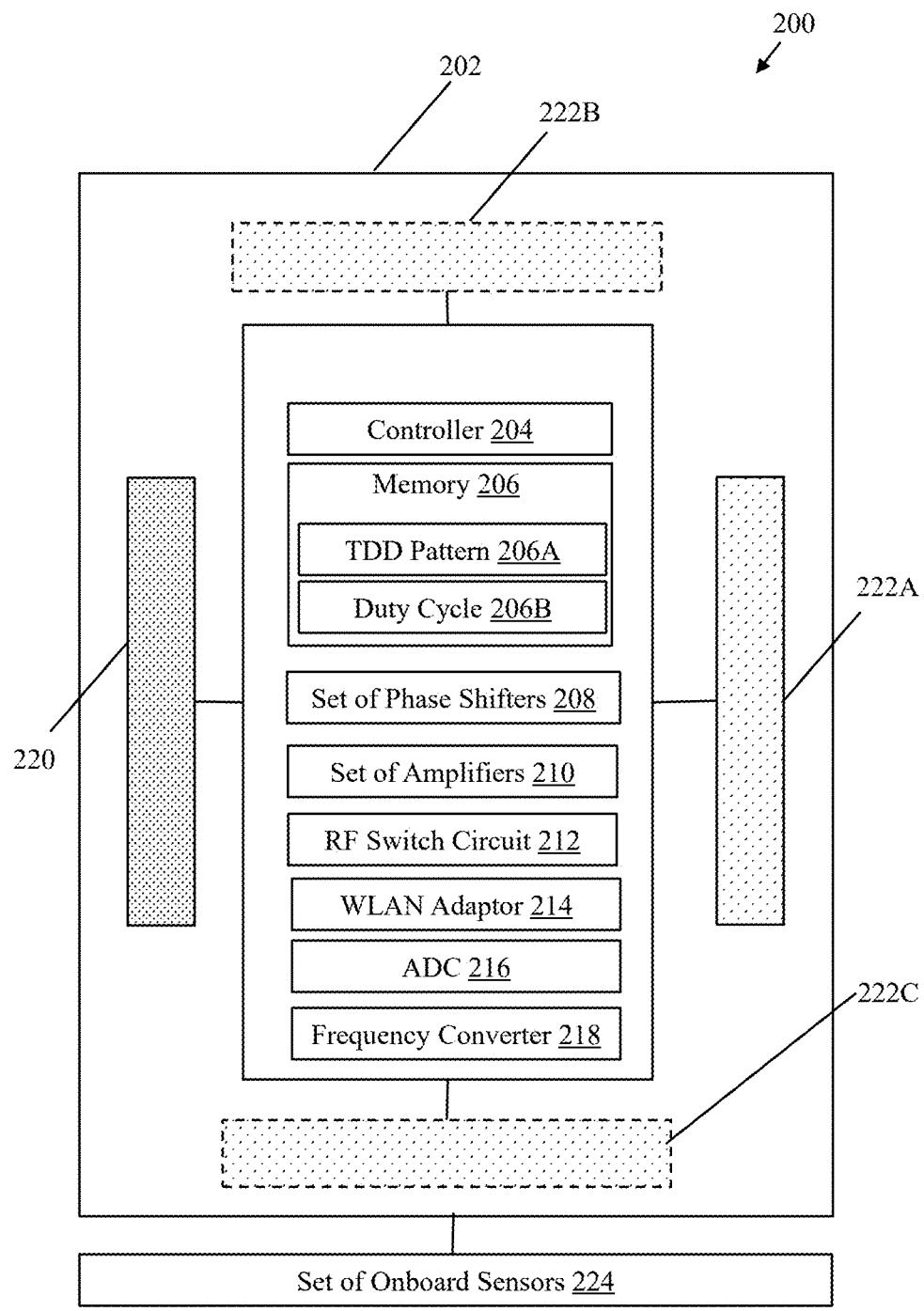
FIG. 2 is a block diagram that illustrates various components of an exemplary repeater device in a system for TDD synchronization in a wireless network, in accordance with an exemplary embodiment of the disclosure.

FIG. 2 is a block diagram that illustrates various components of an exemplary repeater device in a system for synchronization in a wireless network, in accordance with an exemplary embodiment of the disclosure. FIG. 2 is explained in conjunction with elements from FIG. 1. With reference to FIG. 2, there is shown a block diagram 200 of a repeater device 202. The repeater device 202 may correspond to the plurality of repeater devices 106.

The repeater device 202 may include a controller 204, a memory 206, a set of phase shifters 208, a set of amplifiers 210, a radio frequency (RF) switch circuit 212, a wireless local area network (WLAN) adaptor 214, an analog-to-digital converter (ADC) 216, and a frequency converter 218. The repeater device 202 may further include a donor antenna 220 and one or more service phased antenna arrays 222A, 222B, and 222C. Each of the plurality of repeater devices 106 may further include a set of onboard sensors 224.

The controller 204 may be a Field Programmable Gate Array (FPGA), which may be configured to manage digital functions like signal quality indicator data processing, TDD pattern extraction, and timing control functions. The controller 204 may be configured to receive an incoming RF signal from an upstream node and relay the incoming RF signal to one or more neighboring nodes while maintaining TDD synchronization. The controller 204 may be configured to extract signal metadata by digital signal processing of a portion (e.g., a header portion) of the received synchronization signal without interfering with the analog data path. The controller 204 may implement filtering operations to remove transient fluctuations from signal quality indicator data and calculate averages over predetermined time windows. The controller 204 may generate the timing adjustment signals when signal quality averages exceed predefined thresholds and control the TDD switch operations to maintain precise synchronization with the MAP device 104A and other repeater devices of the plurality of repeater devices 106.

The memory 206 may include suitable logic, circuitry, and/or interfaces that may be configured to store instructions executable by the controller 204. The memory 206 may temporarily store and update signal quality indicator data, filtered signal quality measurements, historical timing patterns, and TDD synchronization information extracted from synchronization signals. The memory 206 may maintain buffers for storing sequences of signal quality measurements needed for error pattern analysis and timing drift determination. Examples of implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. The memory 206 may store a TDD pattern 206A, a duty cycle 206B, and other relevant metadata that may include synchronization timestamps, reference clock information, sequence numbers for tracking, error correction codes, signal quality indicators, device identification information, network topology information, and configuration parameters for the repeaters. The memory 206 may also store trained artificial neural network model parameters used for interference pattern identification and timing optimization operations.

The set of phase shifters 208 may be configured to perform precise phase control to digitally steer beams in directed orientations based on beam direction or polarization configuration determined by the trained ANN model 102B (shown in FIG. 1). The set of phase shifters 208 may enable dynamic beam steering to maintain optimal reception of synchronization signals from the MAP device 104A and data communication with other repeater devices of the plurality of repeater devices 106. The phase shifters 208 may be electronically controlled to adjust beam direction in response to identified interference patterns or link quality degradation. In some embodiments, the set of phase shifters 208 may operate in coordination with the controller 204 to implement rapid beam adjustments that maintain synchronization signal quality even when RF conditions change. The phase shifters 208 may support independent control of multiple antenna elements to create highly directional beams that reduce susceptibility to interference and improve synchronization signal reliability.

The set of amplifiers 210 may be configured to provide signal gain to overcome propagation losses and boost signal-to-noise ratio (SNR) to maintain link budgets for both data signals and synchronization signals across multiple hops of relaying through the plurality of repeater devices 106. The set of amplifiers 210 may be high-gain amplifiers designed to operate across multiple frequency bands, including intermediate frequency bands for data signals and lower frequency bands used for synchronization signal transmission. The amplifiers 210 may maintain sufficient gain to ensure reliable reception of synchronization signals even in challenging RF environments where signal strength may be reduced due to distance, obstacles, or interference. In some embodiments, the set of amplifiers 210 may include automatic gain control (AGC) capabilities that adjust amplification levels based on received signal strength to optimize signal quality indicator measurements used for TDD synchronization.

The RF switch circuit 212 may be connected to the set of amplifiers 210 and may function as the TDD switch that generates the TDD signal used to toggle between transmit mode and receive mode at the repeater device 202. The RF switch circuit 212 may be configured to perform precise timing control based on timing adjustment signals generated by the controller 204. The RF switch circuit 212 may implement dynamic beam steering by switching between different service phased antenna arrays, such as the one or more service phased antenna arrays 222A, 222B, and 222C to route RF signals along different directions as required for maintaining synchronization and data communication. The timing edges of the TDD signal generated by the RF switch circuit 212 may be adjusted based on timing adjustment signals and filtered signal quality indicator data to maintain synchronization with other repeater devices of the plurality of repeater devices 106 and the MAP device 104A. In some embodiments, the RF switch circuit 212 may support polarization switching capabilities, allowing the repeater device 202 to switch from a first polarization state to a second polarization state based on interference patterns identified by the trained ANN model 102B.

The WLAN adaptor 214 may be configured to handle lower WLAN frequencies (e.g., 2.4 GHz or 5 GHz in Wi-Fi® 7 or 8) to receive synchronization signals transmitted by the MAP device 104A. The WLAN adaptor 214 may extract timing information, TDD patterns, and duty cycle data from the received synchronization signals and provide the information to the controller 204 for computation. The WLAN adaptor 214 may monitor signal quality indicator data associated with the synchronization signal, including cyclic redundancy check (CRC) error data and error rate data. The WLAN adaptor 214 may be configured to maintain backchannel connectivity with the MAP device 104A via the lower frequency band while the main data path operates on higher frequency bands. In some embodiments, the WLAN adaptor 214 may implement multiple receiver chains to concurrently monitor synchronization signals from multiple sources, enabling the repeater device 202 to maintain synchronization even in complex network topologies.

The ADC 216 may be configured to convert a portion of the synchronization signal from analog to digital domain for signal quality analysis and timing parameter extraction. While the data path may remain entirely analog for lowest latency, the repeater device 202 may utilize the ADC 216 to digitize synchronization signal components for analysis by the controller 204. The ADC 216 may enable the extraction of the signal metadata from synchronization signals, allowing derivation of wireless metrics like timing parameters, signal quality indicators, CRC error rates, interference levels, and timing drift measurements using digital signal processing operations. The ADC 216 may provide sufficient resolution and sampling rate to accurately capture signal quality variations needed for precise TDD synchronization. In some embodiments, the ADC 216 may include multiple channels to concurrently process different components of the synchronization signal or to compare signal quality across different reception paths.

The frequency converter 218 may be configured to process the synchronization signals received on lower frequency bands and convert RF signals between different frequency bands as needed for network operation. The frequency converter 218 may maintain separate processing paths for synchronization signals and data signals, ensuring that timing information extraction does not interfere with low-latency data relay operations. The frequency converter 218 may include phase-locked loop (PLL) circuits that provide stable frequency references needed for precise timing measurements and TDD signal generation. In some embodiments, the frequency converter 218 may support frequency synthesis capabilities that enable the repeater device 202 to generate locally coherent timing references when direct synchronization signals are temporarily unavailable. The frequency converter 218 may coordinate with the controller 204 to ensure that frequency conversion operations maintain the timing accuracy required for TDD synchronization.

The donor antenna 220 may be communicatively coupled to a cascading receiver chain including various components (e.g., a set of low noise amplifiers (LNA), a set of receiver front end phase shifters, and a set of power combiners) for signal reception. The donor antenna 220 may be configured to receive the synchronization signals from the MAP device 104A as well as data signals from upstream nodes. The donor antenna 220 may be a dual-polarized antenna that supports both horizontal and vertical polarizations, enabling the repeater device 202 to receive the synchronization signals regardless of the polarization state used by the transmitting device. The donor antenna 220 may be optimized for the lower frequency bands used for synchronization signal transmission to ensure reliable reception of timing information. In some embodiments, the donor antenna 220 may include beam-steering capabilities that allow the donor antenna 220 to maintain optimal orientation toward the MAP device 104A or upstream repeater devices from the plurality of repeater devices 106 for maximum synchronization signal reliability.

The one or more service phased antenna arrays 222A, 222B, and 222C may be configured to transmit data signals to downstream nodes while maintaining TDD synchronization timing. Each of the one or more service phased antenna arrays 222A, 222B, and 222C may be dual-polarized high-gain phased antenna arrays that support dynamic beam steering and polarization switching based on interference patterns or link quality degradation identified by the trained ANN model 102B. The antenna arrays may be configured to dynamically steer beams of RF signals based on beam direction or polarization configuration determined by the controller 204 to maintain optimal communication links with neighboring repeater devices of the plurality of repeater devices 106. Each antenna array may include individual phase shifters and amplifiers behind each radiating element to shape and control the beam pattern digitally, enabling precise spatial filtering that reduces interference and improves signal quality. In some embodiments, the service phased antenna arrays may coordinate their transmission timing with the TDD signal generated by the RF switch circuit 212 to ensure synchronized network-wide operation.

The set of onboard sensors 224 may include, but not limited to, one or more image sensors, a lidar sensor, a Radar, a spatial position sensor, an inertial measurement unit (IMU) sensor, and a temperature sensor. The set of onboard sensors 224 may provide environmental data that supports TDD synchronization optimization and interference mitigation strategies. The temperature sensor may monitor thermal conditions that could affect timing accuracy, enabling temperature-compensated adjustments to maintain synchronization precision. The spatial position sensor may provide location information used by the MAP device 104A to optimize TDD patterns based on repeater device geographic distribution. The IMU sensor may detect vibrations or orientation changes that could affect antenna alignment and signal quality, triggering adaptive beam steering adjustments. The one or more image sensors, the lidar sensor, and the Radar may detect environmental changes such as moving obstacles that may block synchronization signals, enabling proactive beam steering or polarization adjustments to maintain link quality. In some embodiments, sensor data may be processed by machine learning operations to predict potential synchronization issues and implement preventive measures before timing accuracy is compromised.

In accordance with an embodiment, the system 100 may be configured to achieve sub-microsecond level synchronization accuracy across the plurality of repeater devices 106. The repeater device 202 (or the first repeater device 106A) may maintain timing precision within 100-500 nanoseconds relative to the MAP device 104A through continuous monitoring and adjustment of the TDD signal edges. The system 100 may tolerate frequency drifts up to +50 parts per billion (ppb) without compromising synchronization accuracy by implementing adaptive compensation in the controller 204. The controller 204 may calculate drift rates based on accumulated timing error measurements over extended periods and may apply predictive corrections to counteract expected (or detected) frequency variations. The sub-microsecond accuracy may be achieved through implementation of precision timing circuits that may include crystal oscillators with temperature compensation and phase-locked loop circuits that may provide stable frequency references. The system 100 may maintain synchronization accuracy even during rapid environmental changes by implementing dynamic calibration that may adjust timing parameters based on the detected performance metrics.

In accordance with an embodiment, the WLAN adaptor 214 may implement Wi-Fi® 7 specific timing capabilities including Fine Timing Measurement (FTM) protocols for enhanced synchronization accuracy. The WLAN adaptor 214 may utilize Multiple-Input Multiple-Output (MIMO) Phase Synchronization techniques to coordinate timing across multiple antenna elements of the one or more service phased antenna arrays 222A, 222B, and 222C. The frequency converter 218 may implement enhanced carrier frequency offset (CFO) estimation and compensation that may mitigate the impact of frequency drifts on synchronization performance. The controller 204 may process Wi-Fi® 7 timing markers embedded within the synchronization signals to extract high-precision timestamp information with resolution better than 10 nanoseconds. The system 100 may leverage Wi-Fi® 7's improved signal processing capabilities to maintain synchronization even in high-interference environments where conventional timing recovery methods may fail.

In accordance with an embodiment, the controller 204 may be implemented as a Field Programmable Gate Array (FPGA) with dedicated digital signal processing (DSP) blocks configured to execute real-time timing adjustment. The FPGA implementation may provide processing latencies below 10 microseconds for timing adjustment calculations, enabling rapid response to synchronization deviations. The DSP blocks may implement parallel processing architectures that may concurrently process multiple signal quality indicator streams from different antenna elements or frequency bands. The controller 204 may include dedicated memory blocks with dual-port access capabilities that may enable concurrent read and write operations for real-time data processing without introducing processing delays. The FPGA configuration may be dynamically reconfigurable to implement different filtering operation or timing adjustment operation based on network conditions detected by the trained ANN model 102B.

In accordance with an embodiment, the RF switch circuit 212 may implement phase-locked loop (PLL) circuits with voltage-controlled oscillators (VCOs) that may provide timing resolution better than 1 nanosecond for TDD signal edge control. The PLL circuits may include programmable dividers that may generate multiple synchronized clock signals at different frequencies required for coordination between data transmission and synchronization signal processing. The timing circuits may implement temperature compensation operations using temperature sensors from the set of onboard sensors 224 to adjust oscillator parameters and maintain timing accuracy across operating temperature ranges of −40° C. to +85° C. The RF switch circuit 212 may include multiple timing paths with independent delay elements that may be dynamically adjusted to compensate for propagation delays between different antenna elements or signal processing stages. The precision timing implementation may utilize crystal oscillators with stability specifications better than ±10 parts per million over temperature and aging variations.

In accordance with an embodiment, the controller 204 may implement a digital loop filter analogous to phase-locked loop systems for tracking and correcting timing drift in the TDD signal. The loop filter may process the filtered and averaged signal quality indicator data to generate control signals that may adjust the timing edges of the TDD signal in proportion to detected synchronization errors. The loop filter implementation may include integral and proportional control components (not shown) that may provide both immediate correction for sudden timing deviations and long-term tracking of gradual drift patterns. The filter parameters may be dynamically adjusted based on observed network stability, with higher bandwidth settings for rapidly changing conditions and lower bandwidth for stable environments to minimize noise influence. The loop filter may implement anti-windup operations that may prevent excessive timing corrections during periods of poor signal quality or temporary loss of synchronization signals.

In accordance with an embodiment, the repeater device 202 (or the first repeater device 106A) may perform spatial interference cancellation that may coordinate beam steering and polarization control to concurrently mitigate multiple interference sources. The set of phase shifters 208 may create adaptive antenna patterns with multiple nulls pointing toward identified interference sources while maintaining main beam direction toward the MAP device 104A for synchronization signal reception. The interference mitigation operation may implement real-time spectral analysis that may identify frequency-specific interference patterns and may coordinate with the frequency converter 218 to implement adaptive filtering in both time and frequency domains. The trained ANN model 102B may predict interference patterns based on temporal characteristics and may preemptively adjust antenna configurations to minimize synchronization signal degradation before interference levels become problematic.

In accordance with an embodiment, the system 100 may implement comprehensive performance monitoring capabilities that may track synchronization accuracy, signal quality trends, interference levels, and network topology changes in real-time. The central cloud server 102 may collect performance data from all network nodes and may generate network-wide synchronization health reports that may identify potential issues before they impact network performance. The monitoring system may send automated alert signal that may notify network administrators when synchronization accuracy degrades below predefined thresholds or when interference patterns indicate potential equipment failures. The performance metrics may include statistical analysis of timing jitter, frequency stability measurements, and correlation analysis between environmental conditions and synchronization performance that may guide predictive maintenance scheduling.

In accordance with an embodiment, the system 100 may implement self-healing capabilities where individual repeater devices of the plurality of repeater devices 106 may automatically compensate for timing errors or signal quality degradation without manual intervention. For example, the repeater device 202 (or the first repeater device 106A) may implement backup synchronization to maintain timing coordination even during temporary loss of primary synchronization signals from the MAP device 104A. The self-healing system may include redundant timing references and may automatically switch between synchronization sources based on signal quality assessments performed by the trained ANN model 102B. The adaptive calibration process may periodically verify timing accuracy against multiple reference sources and may adjust internal timing parameters to maintain sub-microsecond synchronization accuracy throughout the operational lifetime of the network deployment.

In accordance with an embodiment, the system 100 may implement multiple fallback synchronization operations when the trained ANN model 102B becomes temporarily unavailable. The controller 204 may automatically switch to predetermined static TDD patterns stored in memory 206 while maintaining basic synchronization functionality. The fallback operation may include crystal oscillator-based timing references with accuracy specifications of ±10 parts per million that may provide stable synchronization during ANN model recovery periods.

Figure 3:
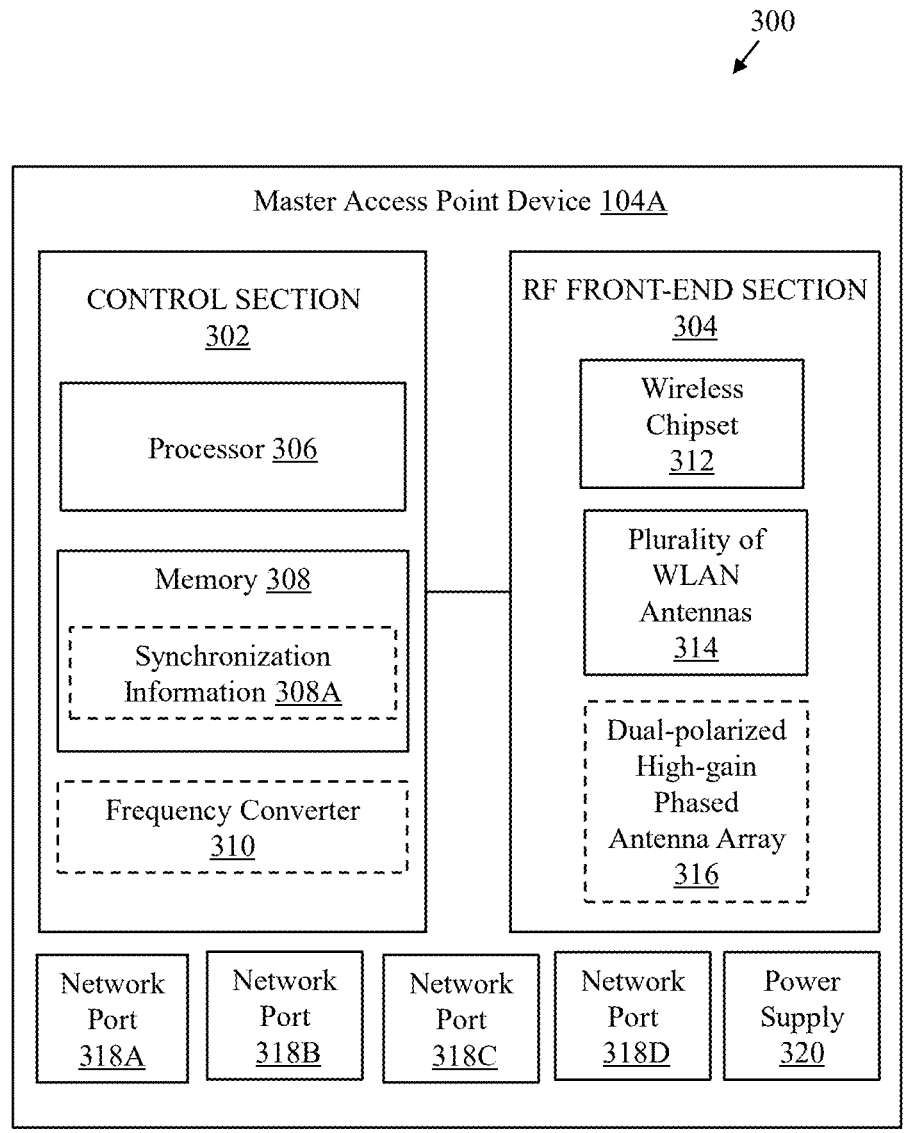
FIG. 3 is a block diagram that illustrates various components of an exemplary master access point (MAP) device in a system for TDD synchronization in a wireless network, in accordance with an exemplary embodiment of the disclosure.

FIG. 3 is a block diagram that illustrates various components of an exemplary master access point (MAP) device in a system for TDD synchronization in a wireless network, in accordance with an exemplary embodiment of the disclosure. FIG. 3 is explained in conjunction with elements from FIGS. 1 and 2. With reference to FIG. 3, there is shown a block diagram 300 of the MAP device 104A. The MAP device 104A may correspond to the one or more MAP devices 104 (FIG. 1). The MAP device 104A may include a control section 302 and a front-end RF section 304. The control section 302 may include a processor 306 and a memory 308, which may include synchronization information 308A. In an implementation, the control section 302 may include a frequency converter 310. In some implementations, the frequency converter 310 may not be provided. The front-end RF section 304 may include a wireless chipset 312 and a plurality of WLAN antennas 314. In some implementations, the MAP device 104A may be modified to further include a high-gain dual polarized antenna, such the phase array antenna 316. The MAP device 104A may include a plurality of network ports, such as network ports 318A to 318D and a power supply 320. The processor 306 may be communicatively coupled to the memory 308, the frequency converter 310 (when provided), and the different components of the front-end RF section 304 and the MAP device 104A.

The processor 306 may also be configured to communicate a wireless local area network (WLAN) signal in a first WLAN frequency from the data source 110. The processor 306 may also be configured to generate and transmit synchronization signals to the plurality of repeater devices 106 for TDD synchronization purposes. The processor 306 may be responsible for overall processing tasks, routing data and managing network operations, and may also handle dynamically determining TDD patterns and duty cycles based on real-time or near real-time network conditions using the trained ANN model 102B (FIG. 1). The processor 306 may analyze network parameters such as the number of active repeater devices and their geographic distribution to optimize TDD patterns and duty cycles. The processor 306 may be a multi-core processor to handle the increased demands of Wi-Fi® 7 or 8, beamforming, Mu-MIMO, and the additional computational requirements for TDD synchronization coordination.

The memory 308 may include the synchronization information 308A that may be used to generate synchronization signals transmitted to the plurality of repeater devices 106. The synchronization information 308A may include TDD patterns, duty cycles, timing parameters, reference clock information, and other data necessary for maintaining network-wide TDD synchronization. The synchronization information 308A may be dynamically updated based on network conditions, device distribution, and performance metrics analyzed by the trained ANN models 102B implemented by the processor 306. The memory 308 may further store temporary data and processing buffers needed for synchronization signal generation and network timing coordination. The memory 308 may also maintain historical synchronization performance data used by machine learning operations to optimize future TDD pattern determinations. Examples of the implementation of the memory 308 may be similar to that of the memory 206 of FIG. 2.

The frequency converter 310 may be present when a functionality of the root node (one of the plurality of repeater devices 106) is implemented in the MAP device 104A. When present, the frequency converter 310 may be used to up convert or down convert frequencies.

The wireless chipset 312 may be a hardware component responsible for generating and transmitting synchronization signals as well as WLAN signals, supporting multiple frequency bands including lower frequencies (e.g., 2.4 GHz) optimized for synchronization signal transmission and higher frequencies (e.g., 5 GHz, and 6 GHz bands or 6-9 GHz bands) for data communication. The wireless chipset 312 may process synchronization signals including modulation of TDD pattern and duty cycle information, timing parameter encoding, and signal amplification to ensure reliable delivery to the plurality of repeater devices 106. The wireless chipset 312 may include radio elements that convert digital synchronization information into radio waves for transmission and support concurrent operation across multiple frequency bands for coordinated data and synchronization signal transmission.

The plurality of WLAN antennas 314 may be configured to transmit and receive WLAN (Wi-Fi®) signals and the synchronization signals. The plurality of WLAN antennas 314 may be in MIMO configuration for performing MU-MIMO and beamforming to enhance coverage and signal strength, for the one or more UEs 108. The number of antennas in the MIMO configuration may vary depending on use case (e.g., consumer grade or enterprise grade), for example 2×2, 4×4 or 8×8 MIMO configurations may be provided.

In some alternate implementations, the MAP device 104A may be modified to include one or more high-gain antennas, such as the phase array antenna 316 to capture a 5G or 6G mm Wave cellular signal from a radio access network (RAN) node (e.g., a gNB or a 5G or 6G small cell) and/or to relay a mm Wave signal to one or more repeater devices of the plurality of repeater devices 106.

The network port 318A may be an optical fiber port. The network port 318B may be an Ethernet port. The network port 318C may be a WLAN Fast Ethernet (FE) port. The network port 318D may be a USB port. The power supply 320 may be configured to provide power to the various components of the MAP device 104A.

Figure 4:
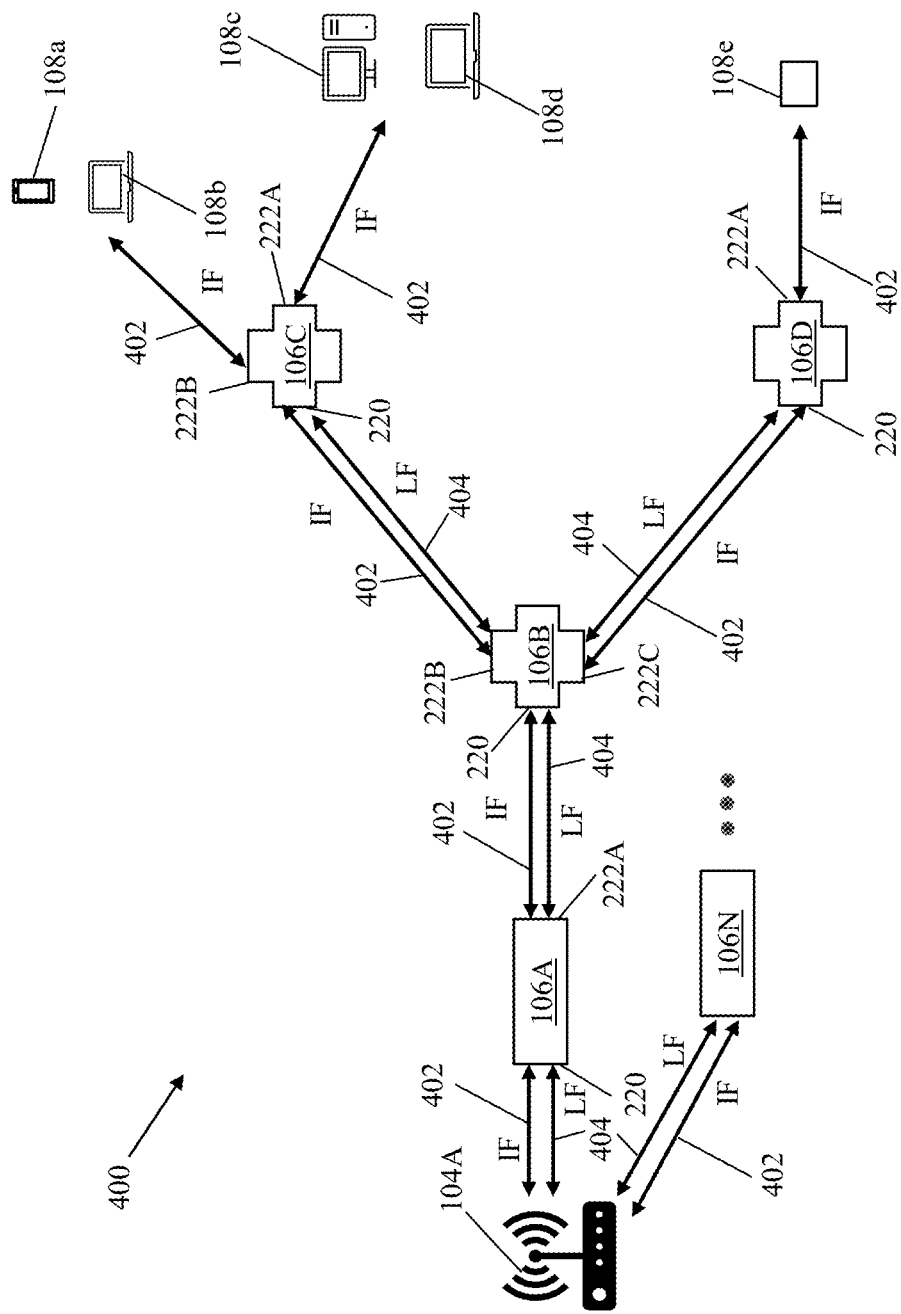
FIG. 4 is a diagram that illustrates an exemplary implementation of a system for TDD synchronization in a wireless network for better synchronization and ultra-reliable communication, in accordance with an exemplary embodiment of the disclosure.

FIG. 4 is a diagram that illustrates an exemplary implementation of a system for TDD synchronization in a wireless network for better synchronization and ultra-reliable communication, in accordance with an exemplary embodiment of the disclosure. FIG. 4 is explained in conjunction with elements from FIGS. 1, 2, and 3. With reference to FIG. 4, there is shown an exemplary system 400 for TDD synchronization in a wireless network that includes the MAP device 104A, a wireless backhauls mesh network of the repeater devices (e.g., the repeater devices 106A, 106B, 106D, and up to 106N), and the UEs 108a, 108b, 108c, 108d, and 108e.

In operation, the MAP device 104A may be configured to periodically transmit synchronization signals 404 via LF (lower frequency) to the plurality of repeater devices 106 (e.g., the repeater devices 106A, 106B, 106D, and up to 106N) for TDD synchronization coordination. The MAP device 104A may also be configured to communicate WLAN data signals 402 and transmit the WLAN data signals 402 via IF (intermediate frequency) from the data source 110 (FIG. 1). The MAP device 104A may dynamically determine TDD patterns and duty cycles based on real-time network conditions using trained artificial neural network (ANN) models and may transmit data over IF that may be higher than LF used to transmit the synchronization signals 404. The MAP device 104A may be at a first location. The plurality of repeater devices 106 (e.g., the repeater devices 106A, 106B, 106D, and up to 106N) may be disposed at a plurality of different locations. The first repeater device 106A may be configured to receive the WLAN data signals 402 from the MAP device 104A and convert the WLAN data signals 402 for IF data transmission, while concurrently receiving the synchronization signals 404 via LF. The first repeater device 106A may utilize the frequency converter 218 to convert the WLAN data signals 402 to beams of RF signals on IF (e.g., mm Wave frequencies or other intermediate frequencies in the range of 10-300 GHz) while processing the synchronization signals 404 separately to extract TDD patterns, duty cycles, and timing information. The first repeater device 106A may be a root node that may then relay the beams of RF signals via IF to one or more second repeater devices (e.g., the repeater devices 106B to 106N) while maintaining TDD synchronization timing coordination through the synchronization signals 404 via LF with all devices in the network.

In this case, the beams of RF signals may be relayed via IF to the repeater device 106B while TDD timing coordination occurs through the synchronization signals 404. The repeater device 106B may be configured as a switch node that may receive the incoming beams of RF signals via IF through the donor antenna 220 from the upstream node (i.e., the first repeater device 106A). The repeater device 106B may monitor signal quality indicator data associated with the synchronization signals 404 received from the MAP device 104A, filter the signal quality indicator data to remove transient fluctuations, and determine averages over predetermined time windows. When the average signal quality exceeds predefined thresholds, the repeater device 106B may generate timing adjustment signals to control the TDD switch (i.e., switching action for TDD) for maintaining synchronization with other devices. The RF switch circuit 212 may be configured to generate TDD signals that toggle between transmit and receive modes based on timing adjustment signals, ensuring coordinated network operation. The repeater device 106B may route the beams of RF signals via IF to downstream nodes (e.g., the repeater device 106D) while maintaining synchronized TDD timing through LF coordination. Each of the plurality of repeater devices 106 (e.g., the repeater devices 106A, 106B, 106D, and up to 106N) may be equipped with the set of amplifiers 210 and the set of phase shifters 208, which enhance signal transmission on both IF and LF and may support beam steering capabilities for maintaining optimal synchronization signal reception and data communication links.

The UEs 108a, 108b, 108c, 108d, and 108e may be configured to receive the WLAN data signals 402 via IF (intermediate frequency) connections that have been relayed through the network of the plurality of repeater devices 106, while the TDD synchronization coordination occurs separately through the synchronization signals 404 via LF (lower frequency) between the MAP device 104A and the plurality of repeater devices 106. Each repeater device may extract TDD patterns and duty cycles from the synchronization signals 404 and adjust timing edges of their generated TDD signals based on timing adjustment signals and filtered signal quality indicator data. The one or more repeater devices may utilize signal quality indicator data from the synchronization signals 404 as feedback to track timing drift and maintain synchronization with other repeater devices of the plurality of repeater devices 106 (e.g., the repeater devices 106A, 106B, 106D, and up to 106N) and the MAP device 104A. In some embodiments, the one or more repeater devices of the plurality of repeater devices 106 may identify interference patterns or link quality degradation using the trained ANN models (e.g., the trained ANN model 102B of FIG. 1) based on the quality of the synchronization signal 404 and may switch between different polarization states or adjust beam directions to maintain optimal synchronization signal reception. The one or more repeater devices of the plurality of repeater devices 106 may extend the coverage area of the MAP device 104A while maintaining precise TDD synchronization across the entire network. The data propagation path through the network of the plurality of repeater devices 106 may operate on IF for high-speed, low-latency data transmission to the UEs 108, while the TDD synchronization operation operates through the separate synchronization signals 404 via LF. The dual-frequency approach to receive the WLAN data signals 402 via IF and to receive the synchronization signal 404 via LF enables the system 400 to maintain sub-microsecond synchronization accuracy on LF while supporting high-throughput data transmission on IF with minimal latency throughout the extended network coverage area.

Figure 5A:
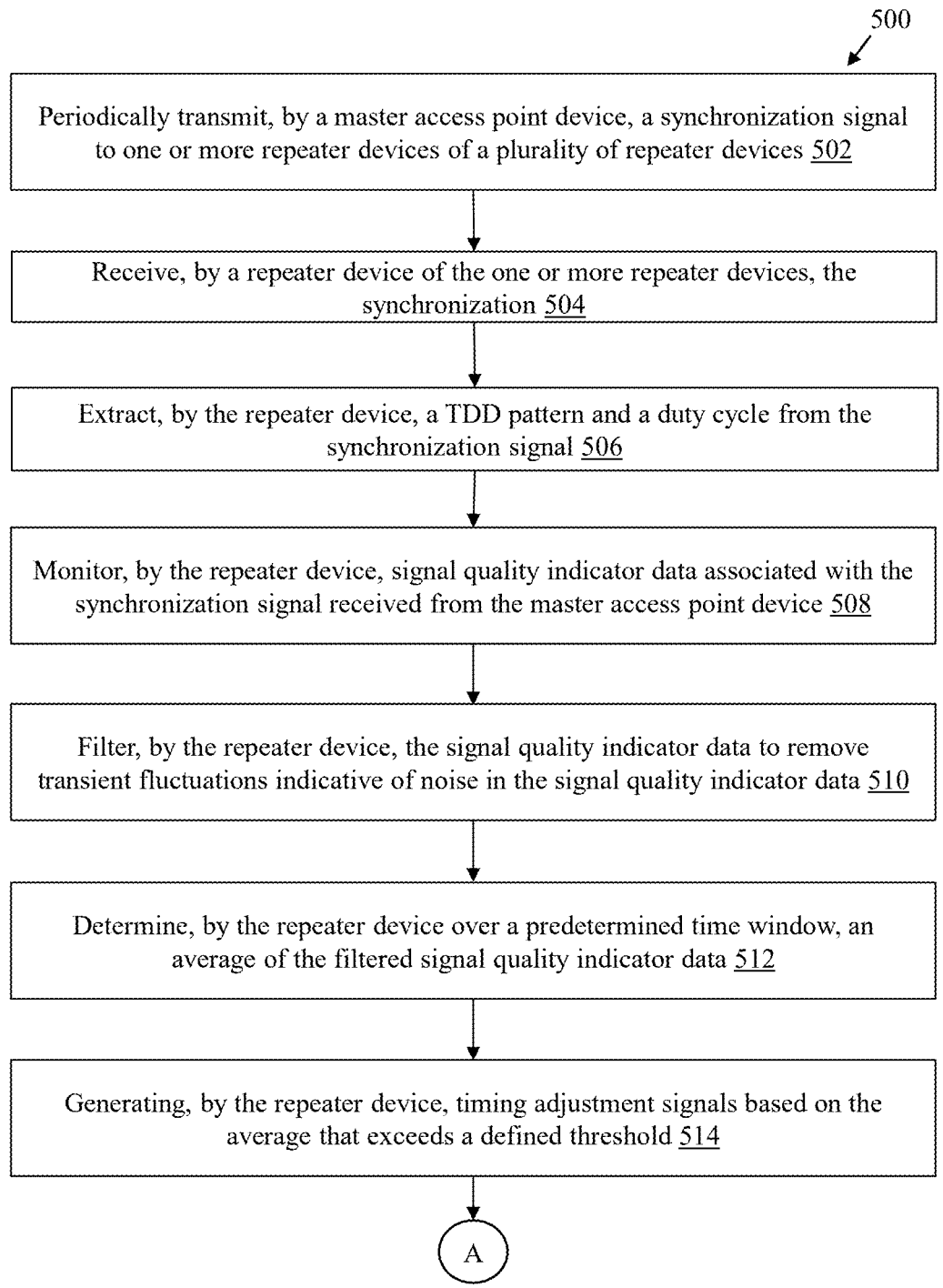
FIGS. 5A and 5B are diagrams that collectively illustrate a flowchart of a method for TDD synchronization in a wireless network for better synchronization and ultra-reliable communication, in accordance with an embodiment of the disclosure.
Figure 5B:
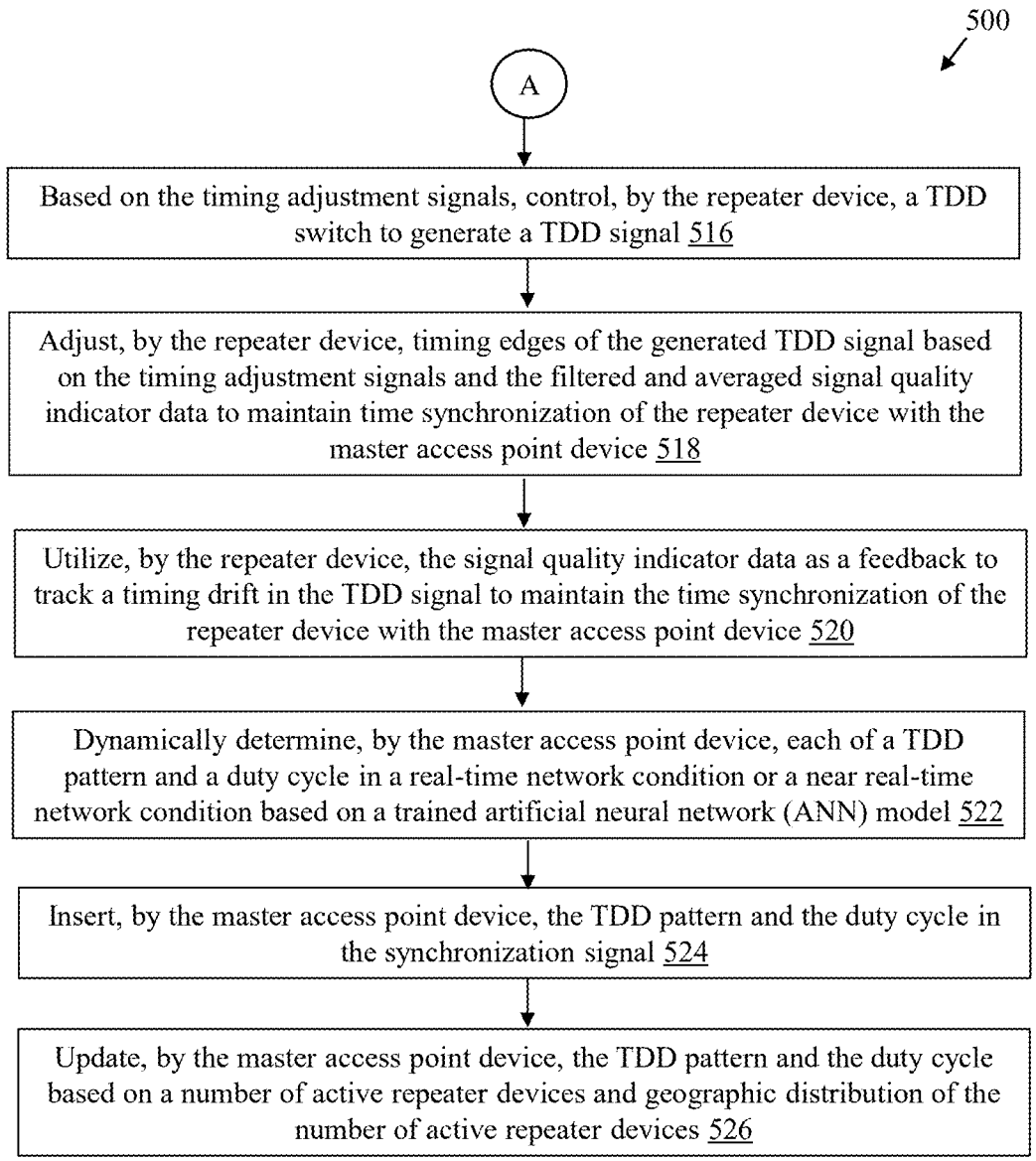

FIGS. 5A and 5B, collectively, is a flowchart of a method for TDD synchronization in a wireless network for better synchronization and ultra-reliable communication, in accordance with an embodiment of the disclosure. FIGS. 5A to 5B are explained in conjunction with elements from FIGS. 1, 2, 3, and 4. With reference to 5A and 5B, there is shown a flowchart of a method 500 including exemplary operations 502 through 526. The method 500 may be implemented in the central cloud server 102 of the system 100 or 400.

At 502, the synchronization signal may be periodically transmitted to one or more repeater devices of the plurality of repeater devices 106 by the MAP device 104A.

At 504, the first repeater device 106A of the one or more repeater devices may receive the synchronization signal 404.

At 506, each of the TDD pattern 206A and the duty cycle 206B may be extracted from the synchronization signal 404 by the first repeater device 106A.

At 508, the signal quality indicator data associated with the synchronization signal 404 received from the MAP device 104A may be monitored by the first repeater device 106A of the plurality of repeater devices 106. The signal quality indicator data may include at least one of the cyclic redundancy check (CRC) error data or the error rate data.

At 510, the signal quality indicator data may be filtered by the first repeater device 106A to remove transient fluctuations indicative of noise in the signal quality indicator data.

At 512, an average of the filtered signal quality indicator data may be determined by the first repeater device 106A over the predetermined time window.

At 514, the timing adjustment signals may be generated by the first repeater device 106A based on the average determined at 512 that exceeds the defined threshold.

At 516, based on the timing adjustment signals, a TDD switch may be controlled by the repeater device to generate a TDD signal.

At 518, based on the timing adjustment signals and the filtered and averaged signal quality indicator data, the timing edges of the generated TDD signal may be adjusted by the first repeater device 106A to maintain time synchronization of the first repeater device 106A with the MAP device 104A.

At 520, the signal quality indicator data may be utilized as the feedback to track the timing drift in the TDD signal by the first repeater device 106A to maintain the time synchronization of the first repeater device 106A with the MAP device 104A.

At 522, based on the trained ANN model 102B, each of the TDD pattern 206A and the duty cycle 206B may be dynamically determined by the MAP device 104A in a real-time network condition or a near real-time network condition.

At 524, each of the TDD pattern 206A and the duty cycle 206B may be inserted in the synchronization signal 404 by the MAP device 104A.

At 526, the TDD pattern 206A and the duty cycle 206B may be updated by the MAP device 104A based on a number of active repeater devices and the geographic distribution of a number of active repeater devices (e.g., among the plurality of repeater devices 106).

Various embodiments of the disclosure may provide the system 100 or 400 (FIG. 1 or 4) for TDD synchronization in a wireless network. The system 100 or 400 includes the MAP device 104A that may be configured to periodically transmit the synchronization signal 404 to one or more repeater devices of the plurality of repeater devices 106. The one or more repeater devices includes the repeater device (e.g., the first repeater device 106A) may be configured to receive the synchronization signal, monitor the signal quality indicator data associated with the synchronization signal 404 received from the MAP device 104A. The first repeater device 106A may be further configured to filter the signal quality indicator data to remove transient fluctuations indicative of noise in the signal quality indicator data. The first repeater device 106A may be further configured to determine, over the predetermined time window, the average from the filtered signal quality indicator data. The first repeater device 106A may be further configured to generate the timing adjustment signals based on the average that exceeds the defined threshold. The first repeater device 106A may be further configured to control, based on the timing adjustment signals, the TDD switch to generate the TDD signal. The first repeater device 106A may be further configured to adjust timing edges of the generated TDD signal based on the timing adjustment signals and the filtered and averaged signal quality indicator data to maintain time synchronization of the first repeater device 106A with the MAP device 104A.

Various embodiments of the disclosure may provide a computer program product for time division duplexing (TDD) synchronization in a wireless network, the computer program product including a computer-readable storage medium (e.g., a non-transitory computer-readable storage medium) having program instructions embodied therewith, the program instructions are executable by a system to cause the system to execute operations, the operations including periodically transmitting, by the MAP device 104A, the synchronization signal 404 to one or more repeater devices of the plurality of repeater devices 106. The operations may further include receiving, by the first repeater device 106A of the one or more repeater devices, the synchronization signal 404. The operations may further include monitoring, by the first repeater device 106A, the signal quality indicator data associated with the synchronization signal 404 received from the MAP device 104A. The operations may further include filtering, by the first repeater device 106A, the signal quality indicator data to remove transient fluctuations indicative of noise in the signal quality indicator data. The operations may further include determining, by the first repeater device 106A over the predetermined time window, the average of the filtered signal quality indicator data. The operations further include generating, by the first repeater device 106A, the timing adjustment signals based on the average that exceeds the defined threshold. The operations may further include controlling, by the first repeater device 106A based on the timing adjustment signals, the TDD switch to generate the TDD signal. The operations may further include adjusting, by the first repeater device 106A, the timing edges of the generated TDD signal based on the timing adjustment signals and the filtered and averaged signal quality indicator data to maintain time synchronization of the first repeater device 106A with the MAP device 104A.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A system for time division duplexing (TDD) synchronization in a wireless network, comprising:
   a master access point device configured to periodically transmit a synchronization signal to one or more repeater devices of a plurality of repeater devices; and
   the one or more repeater devices comprise a repeater device configured to:
      receive the synchronization signal;
      monitor signal quality indicator data associated with the synchronization signal received from the master access point device;
      filter the signal quality indicator data to remove transient fluctuations indicative of noise in the signal quality indicator data;
      determine, over a predetermined time window, an average from the filtered signal quality indicator data;
      generate timing adjustment signals based on the average that exceeds a defined threshold;
      control, based on the timing adjustment signals, a TDD switch to generate a TDD signal; and
      adjust timing edges of the generated TDD signal based on the timing adjustment signals and the filtered signal quality indicator data to maintain time synchronization of the repeater device with the master access point device.

2. The system of claim 1, wherein the repeater device is further configured to utilize the signal quality indicator data as a feedback to track a timing drift in the TDD signal to maintain the time synchronization of the repeater device with the master access point device.

3. The system of claim 1, wherein the signal quality indicator data comprises at least one of cyclic redundancy check (CRC) error data or error rate data.

4. The system of claim 1, wherein the master access point device is further configured to:
   dynamically determine each of a TDD pattern and a duty cycle in a real-time network condition or a near real-time network condition based on a trained artificial neural network (ANN) model; and
   insert the TDD pattern and the duty cycle in the synchronization signal.

5. The system of claim 4, wherein the master access point device is further configured to update the TDD pattern and the duty cycle based on a number of active repeater devices and geographic distribution of the number of active repeater devices.

6. The system of claim 1, wherein the repeater device is further configured to extract a TDD pattern and a duty cycle from the synchronization signal.

7. The system of claim 1, wherein the repeater device is further configured to adjust the defined threshold for the generation of the timing adjustment signals based on a historical pattern in the signal quality indicator data.

8. The system of claim 1, wherein the repeater device is further configured to:
   monitor an error pattern in the average of the filtered signal quality indicator data over time; and
   determine a direction of a timing drift between the TDD signal of the repeater device and the synchronization signal from the master access point device based on the monitored error pattern for the adjustment of the timing edges of the TDD signal.

9. The system of claim 1, wherein based on the monitored signal quality indicator data associated with the synchronization signal, the repeater device is further configured to identify an interference pattern in the synchronization signal or a degradation in link quality of the synchronization signal using a trained artificial neural network (ANN) model.

10. The system of claim 9, wherein the repeater device is further configured to switch from a first polarization state to a second polarization state based on the identified interference pattern or the degradation in the link quality.

11. The system of claim 10, wherein the repeater device is further configured to determine, based on an output from the trained ANN model, a beam direction or a polarization configuration to mitigate the identified interference pattern or the degradation in the link quality.

12. The system of claim 11, wherein the repeater device comprises one or more dual-polarized high-gain phased antenna arrays configured to dynamically steer a beam of RF signals based on the beam direction or the polarization configuration to maintain a reception of the synchronization signal from the master access point device as well as data communication with other repeater devices of the plurality of repeater devices.

13. The system of claim 1, wherein the master access point device is further configured to:
   transmit data over a first frequency band that is higher than a second frequency band, and
   transmit the synchronization signal to the repeater device over the second frequency band.

14. A method for time division duplexing (TDD) synchronization in a wireless network, comprising:
   periodically transmitting, by a master access point device, a synchronization signal to one or more repeater devices of a plurality of repeater devices;
   receiving, by a repeater device of the one or more repeater devices, the synchronization signal;
   monitoring, by the repeater device, signal quality indicator data associated with the synchronization signal received from the master access point device;
   filtering, by the repeater device, the signal quality indicator data to remove transient fluctuations indicative of noise in the signal quality indicator data;
   determining, by the repeater device over a predetermined time window, an average of the filtered signal quality indicator data;
   generating, by the repeater device, timing adjustment signals based on the average that exceeds a defined threshold;
   based on the timing adjustment signals, controlling, by the repeater device, a TDD switch to generate a TDD signal; and
   adjusting, by the repeater device, timing edges of the generated TDD signal based on the timing adjustment signals and the filtered and averaged signal quality indicator data to maintain time synchronization of the repeater device with the master access point device.

15. The method of claim 14, further comprising utilizing, by the repeater device, the signal quality indicator data as a feedback to track a timing drift in the TDD signal to maintain the time synchronization of the repeater device with the master access point device.

16. The method of claim 14, wherein the signal quality indicator data comprises at least one of cyclic redundancy check (CRC) error data or error rate data.

17. The method of claim 14, further comprising:
   dynamically determining, by the master access point device, each of a TDD pattern and a duty cycle in a real-time network condition or a near real-time network condition based on a trained artificial neural network (ANN) model; and inserting, by the master access point device, the TDD pattern and the duty cycle in the synchronization signal.

18. The method of claim 17, further comprising updating, by the master access point device, the TDD pattern and the duty cycle based on a number of active repeater devices and geographic distribution of the number of active repeater devices.

19. The method of claim 14, further comprising extracting, by the repeater device, a TDD pattern and a duty cycle from the synchronization signal.

20. A computer program product for time division duplexing (TDD) synchronization in a wireless network, the computer program product comprising non-transitory computer-readable storage medium having program instructions embodied therewith, the program instructions are executable by a system to cause the system to execute operations, the operations comprising:

periodically transmitting, by a master access point device, a synchronization signal to one or more repeater devices of a plurality of repeater devices;

receiving, by a repeater device of the one or more repeater devices, the synchronization;

monitoring, by the repeater device, signal quality indicator data associated with the synchronization signal received from the master access point device;

filtering, by the repeater device, the signal quality indicator data to remove transient fluctuations indicative of noise in the signal quality indicator data;

determining, by the repeater device over a predetermined time window, an average of the filtered signal quality indicator data;

generating, by the repeater device, timing adjustment signals based on the average that exceeds a defined threshold;

based on the timing adjustment signals, controlling, by the repeater device, a TDD switch to generate a TDD signal; and adjusting, by the repeater device, timing edges of the generated TDD signal based on the timing adjustment signals and the filtered and averaged signal quality indicator data to maintain time synchronization of the repeater device with the master access point device.

* * * * *